United States Patent
Kubota et al.

(10) Patent No.: US 9,758,060 B2
(45) Date of Patent: Sep. 12, 2017

(54) SEAT WITH RECLINER LIMIT SWITCH ASSEMBLY AND METHOD OF USE THEREOF

(71) Applicant: HONDA MOTOR CO., LTD., Minato-ku, Tokyo (JP)

(72) Inventors: Yuji Kubota, Marysville, OH (US); Carlington George Demetrius, Dublin, OH (US); Masaki Shimazu, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/003,586

(22) Filed: Jan. 21, 2016

(65) Prior Publication Data

US 2017/0210246 A1    Jul. 27, 2017

(51) Int. Cl.
*B60N 2/20* (2006.01)
*B60N 2/22* (2006.01)
*B60N 2/02* (2006.01)

(52) U.S. Cl.
CPC ......... *B60N 2/0244* (2013.01); *B60N 2/0232* (2013.01); *B60N 2/20* (2013.01); *B60N 2/2227* (2013.01); *B60N 2002/0236* (2013.01)

(58) Field of Classification Search
CPC .. B60N 2/0244; B60N 2/2227; B60N 2/0232; B60N 2/20
USPC ............................ 297/362.11, 326.12, 326.14
See application file for complete search history.

(56) References Cited

U.S. PATENT DOCUMENTS

| | | | |
|---|---|---|---|
| 4,335,919 A | 6/1982 | Nagashima et al. | |
| 4,460,217 A | 7/1984 | Tsuda et al. | |
| 7,152,922 B2 * | 12/2006 | Garland ............. | B60N 2/01583 297/362.11 X |
| 7,500,719 B2 | 3/2009 | Kojima | |
| 7,661,760 B2 | 2/2010 | Nakaya et al. | |
| 7,673,943 B2 | 3/2010 | Ohta et al. | |
| 7,976,103 B2 | 7/2011 | Gamache et al. | |
| 8,388,067 B2 * | 3/2013 | Hida ................... | B60N 2/0232 297/362.11 X |
| 8,511,750 B2 * | 8/2013 | Moriyama .......... | B60N 2/0232 297/362.11 |
| 2007/0063567 A1 * | 3/2007 | Nakaya ............... | B60N 2/0232 297/362.11 |
| 2007/0200408 A1 * | 8/2007 | Ohta .................... | B60N 2/0232 297/362.11 |
| 2013/0278036 A1 | 10/2013 | Worden | |

* cited by examiner

*Primary Examiner* — Rodney B White
(74) *Attorney, Agent, or Firm* — Arent Fox LLP

(57) ABSTRACT

The disclosure provides a seat for an automotive vehicle, including a seat bottom frame, a seat back frame rotatably coupled with the seat bottom frame and a limit switch assembly. The limit switch assembly comprises a limit switch configured to prevent rotation of the seat back when the limit switch is opened, a link moveable from a first position in which the limit switch is closed to a second position in which the limit switch is open, and a bias member configured to impart a bias force on the link in a direction toward the first position. The disclosure also provides a method of reclining the seat.

20 Claims, 22 Drawing Sheets

US 9,758,060 B2

SEAT WITH RECLINER LIMIT SWITCH ASSEMBLY AND METHOD OF USE THEREOF

BACKGROUND

Aspects of the present disclosure relate generally to methods and apparatuses for adjusting vehicle seats, and more specifically, to methods and apparatuses for protecting a limit switch included in the power seats.

Vehicles can be provided with various systems and apparatuses for adjusting the seats of vehicular occupants. For example, it may be beneficial to adjust the incline defined between upper and lower seat portions, such as between 90 degrees (with the passenger sitting straight up) and 180 degrees (with the passenger lying flat). The overall tilt of the seat, including both the upper and lower seat portions, can also be adjusted, thereby directing the overall angle of orientation of the passenger's body. Additionally, vehicular seats can be adjusted in a longitudinal direction of the vehicle, such as toward and away from the front of the vehicle. This front and rear adjustment may be especially beneficial because it enables passengers of different sizes to be accommodated. For example, a relatively tall passenger may desire to sit in a relatively rearward position, while a relative forward position may be desirable for a relatively small passenger.

Known power seat adjustment systems include electric motors configured to move at least a portion of the seat and at least one seat adjustment switch. An operator controls the electric motors using the seat adjustment switches.

Furthermore, known power seat adjustment systems include a limit switch configured to discontinue operation of the electric motor when a portion of the seat reaches a predefined limit, regardless of whether the operator is requesting further movement of the seat. Actuating the limit switches in known seat adjustment systems involves directly actuating the switch with an element of the seat having momentum directly corresponding to the momentum of the movement of the seat. However, directly impacting the limit switch with such momentum may damage the limit switch. Thus, there is a need in the art for a seat with a limit switch assembly that decreases, minimizes, and/or prevents a risk of damaging the limit switch.

SUMMARY

According to one aspect, the disclosure provides a power seat for a vehicle, comprising a seat bottom frame, a seat back frame rotatably coupled with the seat bottom frame and a limit switch assembly for use with operation of the power seat. The limit switch assembly includes a limit switch configured to prevent rotation of the seat back when the limit switch is opened, a link moveable from a first position in which the limit switch is closed to a second position in which the limit switch is open, and a bias member configured to impart a bias force on the link in a direction toward the first position.

In another aspect, the disclosure provides a method of reclining a seat for a vehicle, the seat including a seat bottom frame, a seat back frame rotatably coupled with the seat bottom frame, and a limit switch assembly, the limit switch assembly including a link, a limit switch, and a bias member. The method includes rotating the seat back frame in a rearward direction, and moving the link from a first position to a second position, including overcoming a bias force imparted by the bias member on the link in a direction toward the first position. The movement of the link from the first position to the second position opens the limit switch, thereby preventing further rotating the seat back frame in the rearward direction.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

Figure 9:
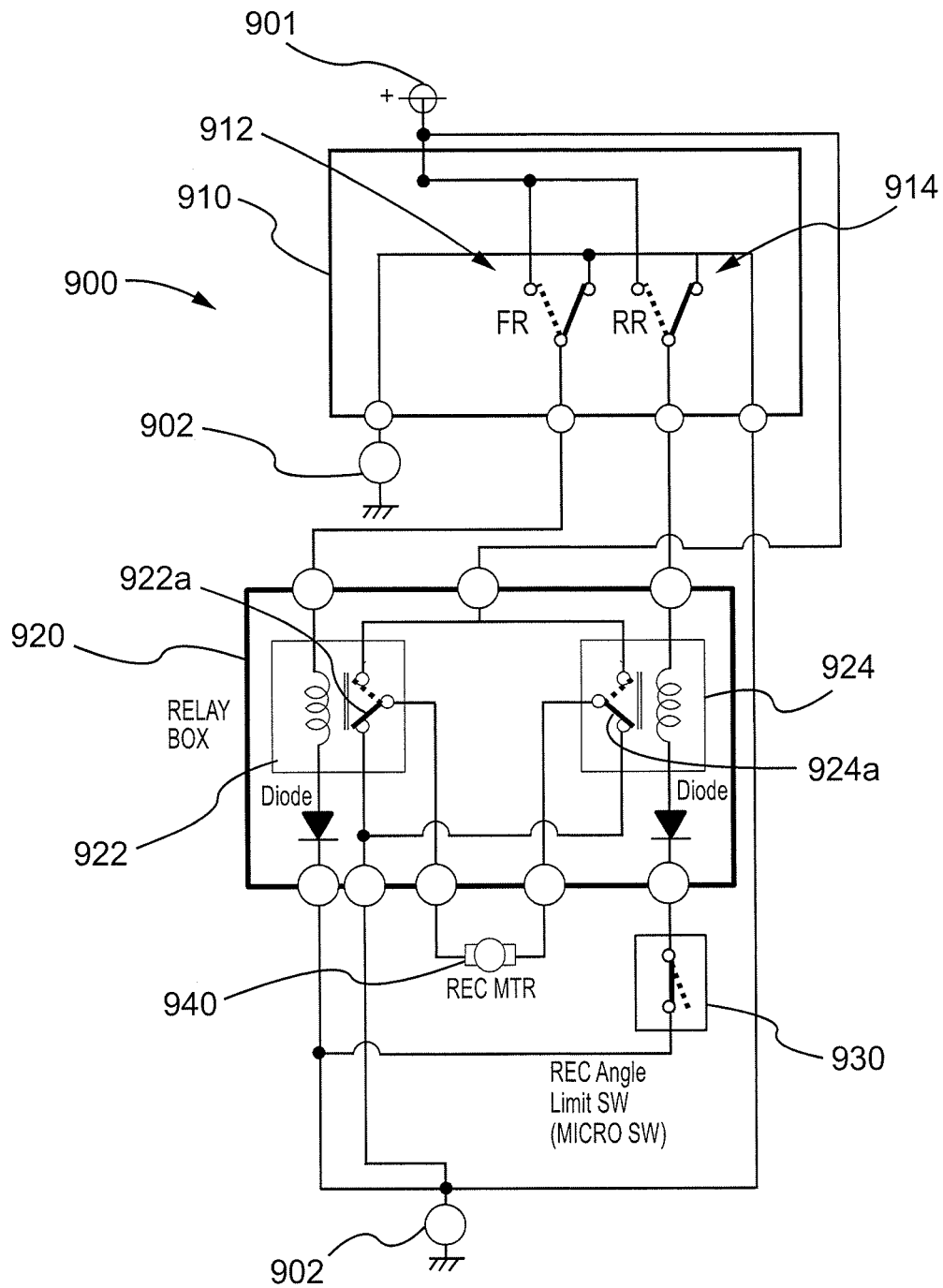
FIG. 9 shows an example circuit diagram for a circuit for controlling a seat, in accordance with aspects of the present disclosure.
Figure 9A:
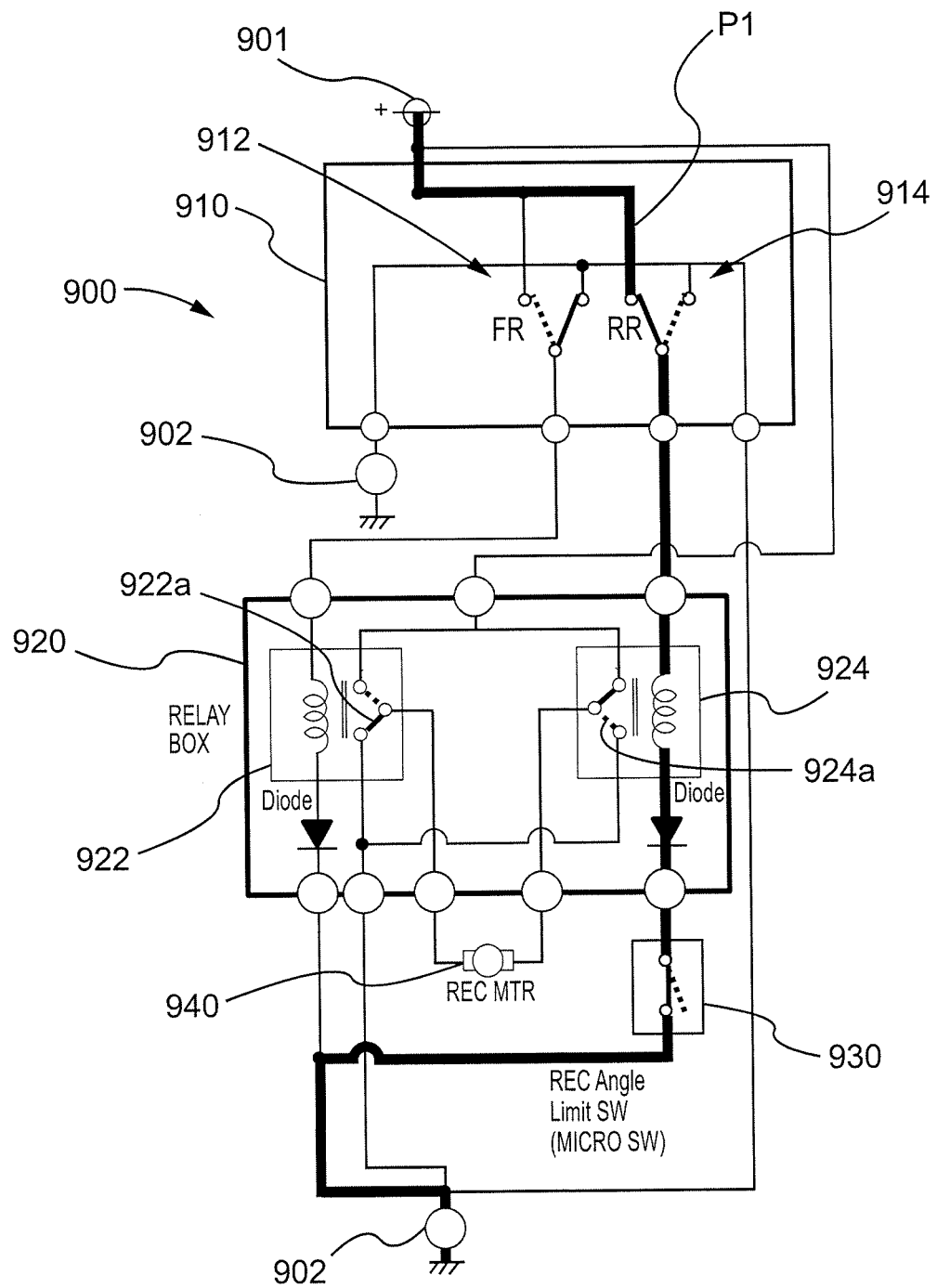
FIG. 9A presents a representative view of a first operational state of the circuit of FIG. 9, showing a first circuit path during rear recline operation of the seat being initiated.
Figure 9B:
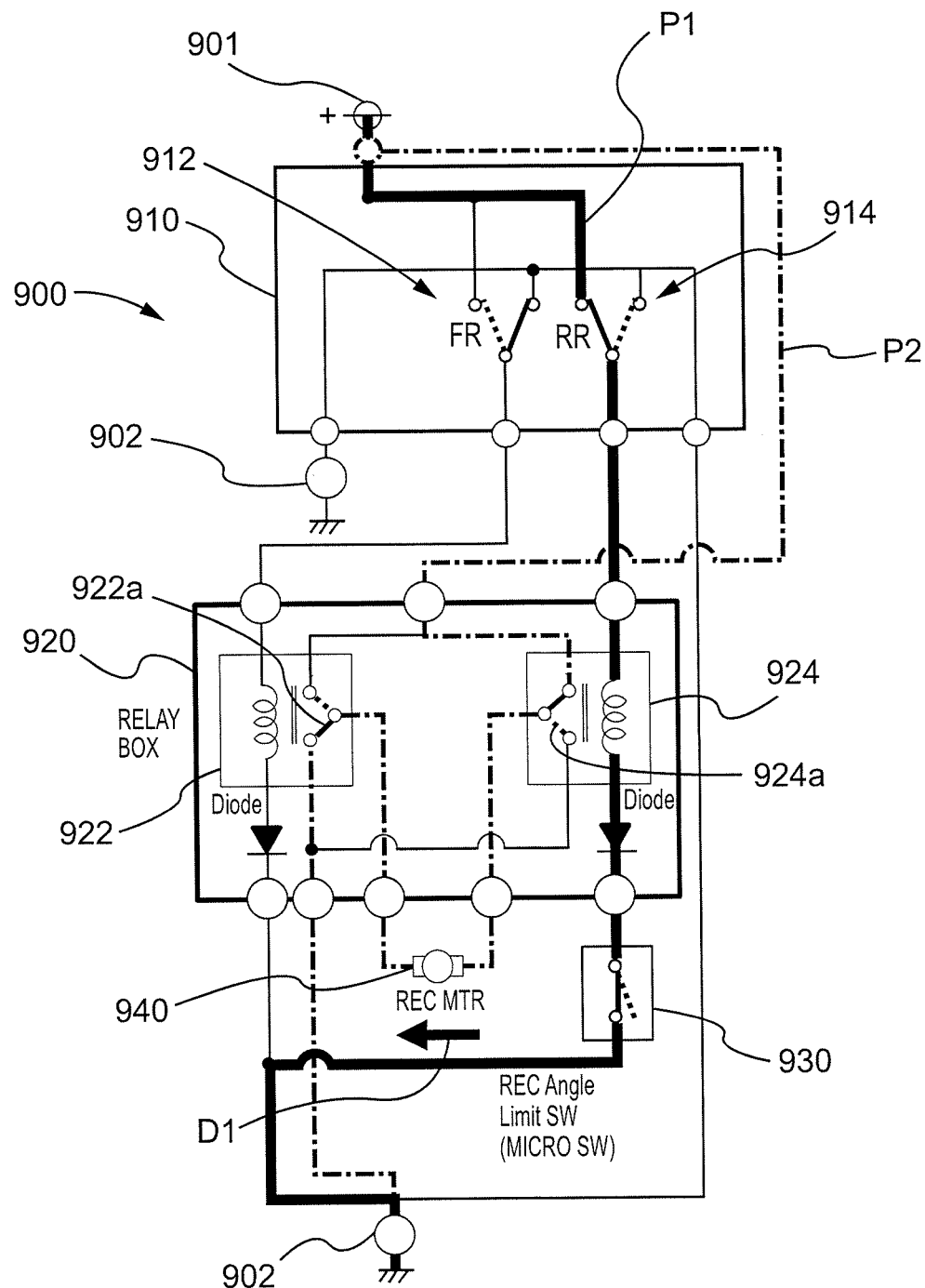
FIG. 9B presents a representative view of a second operational state of the circuit of FIG. 9, wherein, following the operational state of FIG. 9A commencing, a second circuit path causes operation of the motor in a first direction, so as to cause recline operation of the seat.
Figure 9C:
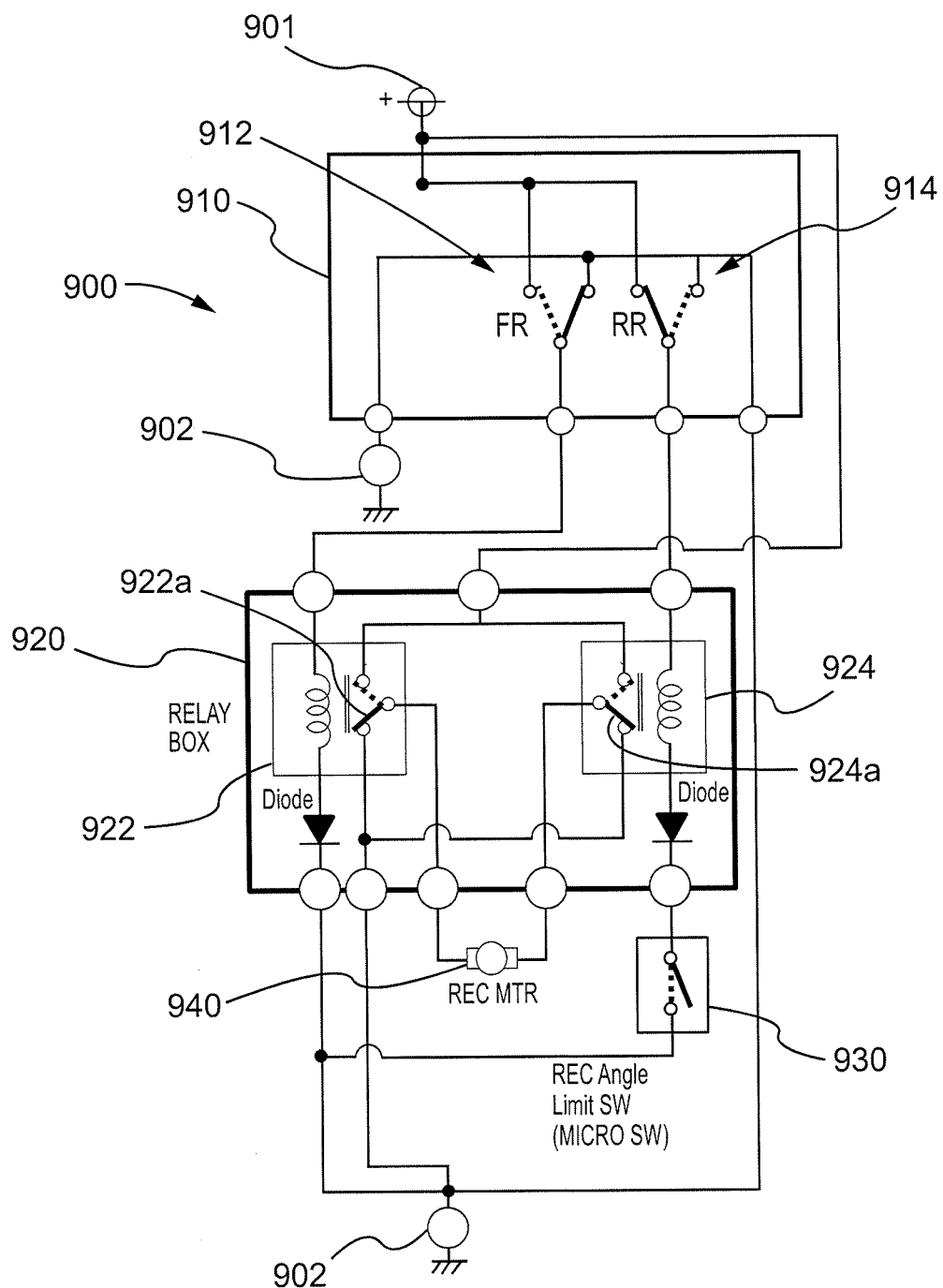
FIG. 9C shows a representative view of a third operational state of the circuit of FIG. 9, wherein, upon a switch being caused to open, such as via movement of a reclining seat to a maximum recline position, the first circuit path of FIG. 9A is opened, thereby also opening the second circuit path of FIG. 9B, thereby halting recline operation of the seat.
Figure 9D:
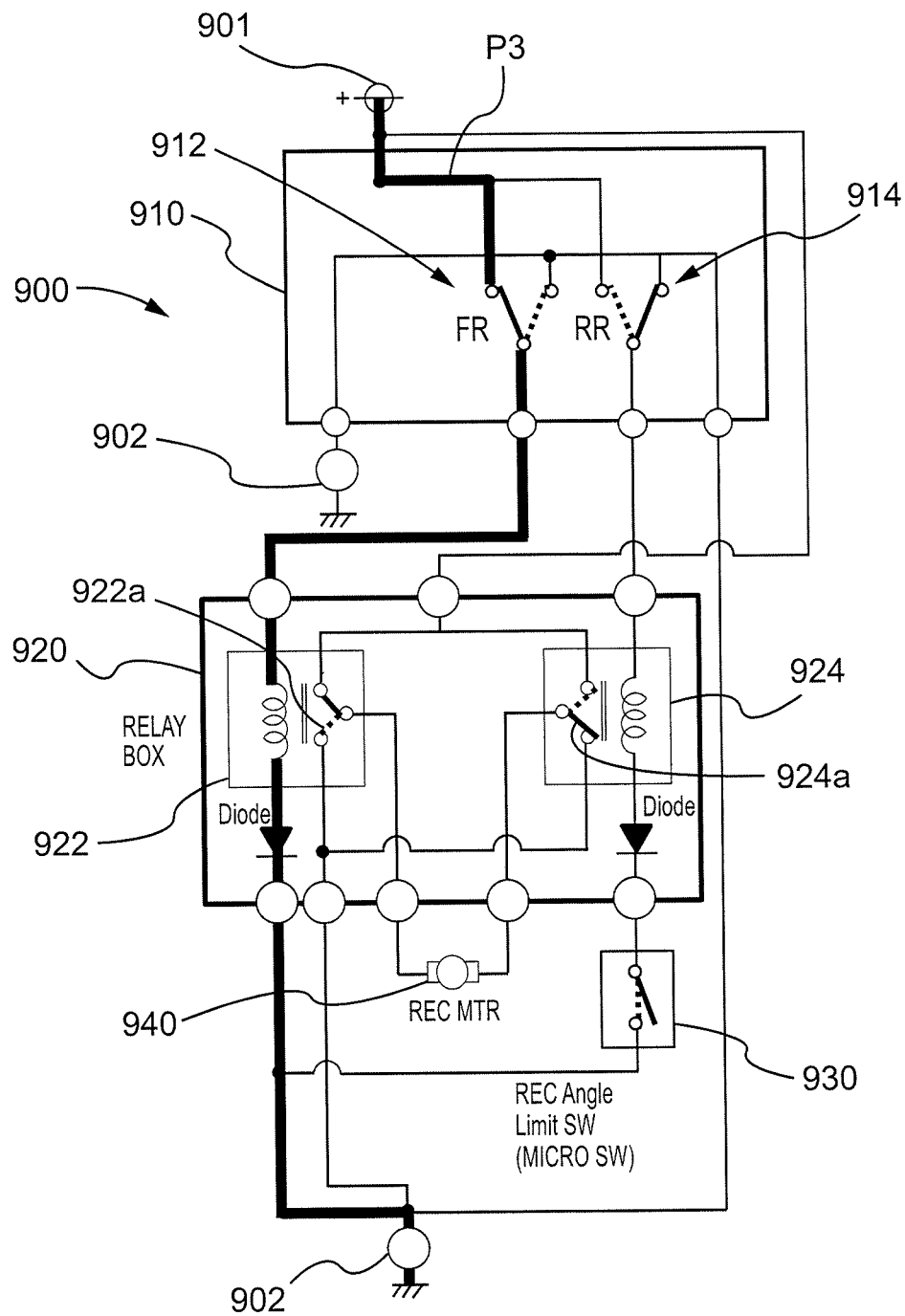
Figure 9E:
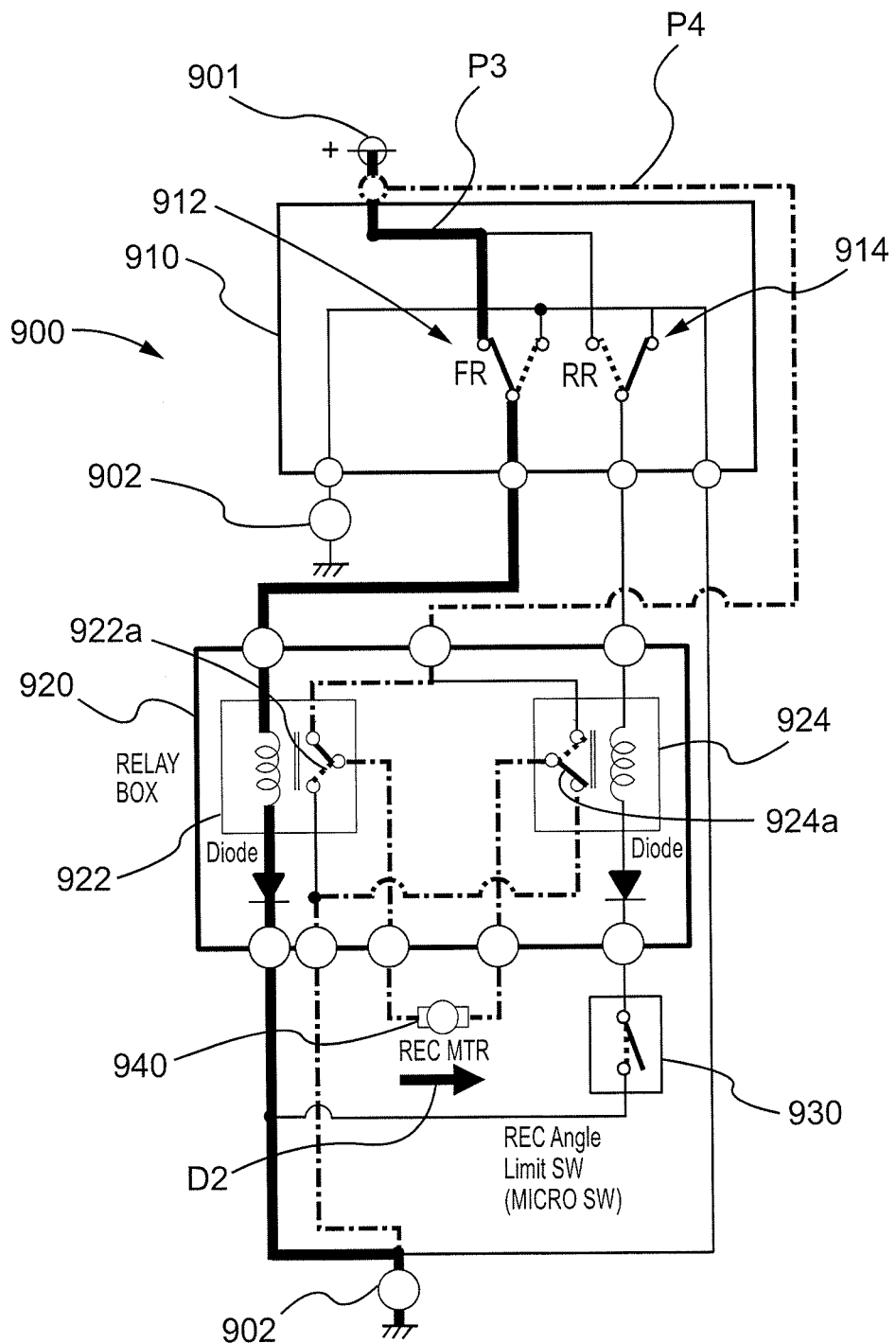
Figure 10:
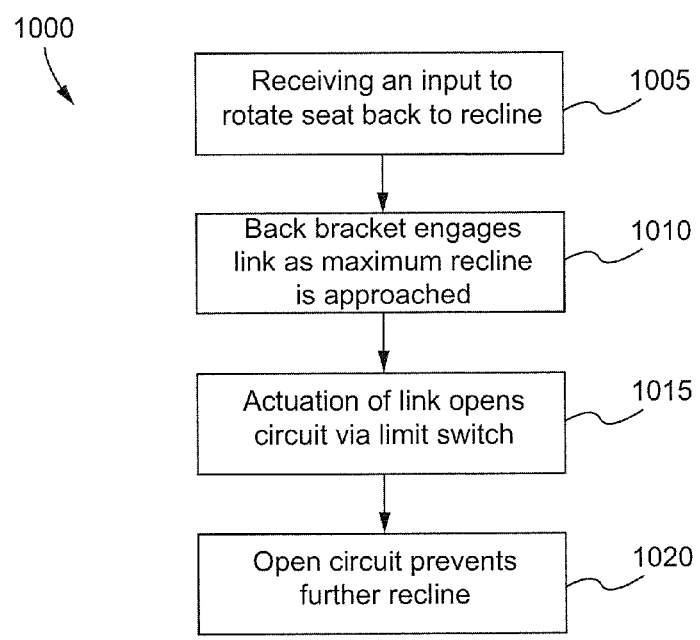
Figure 11:
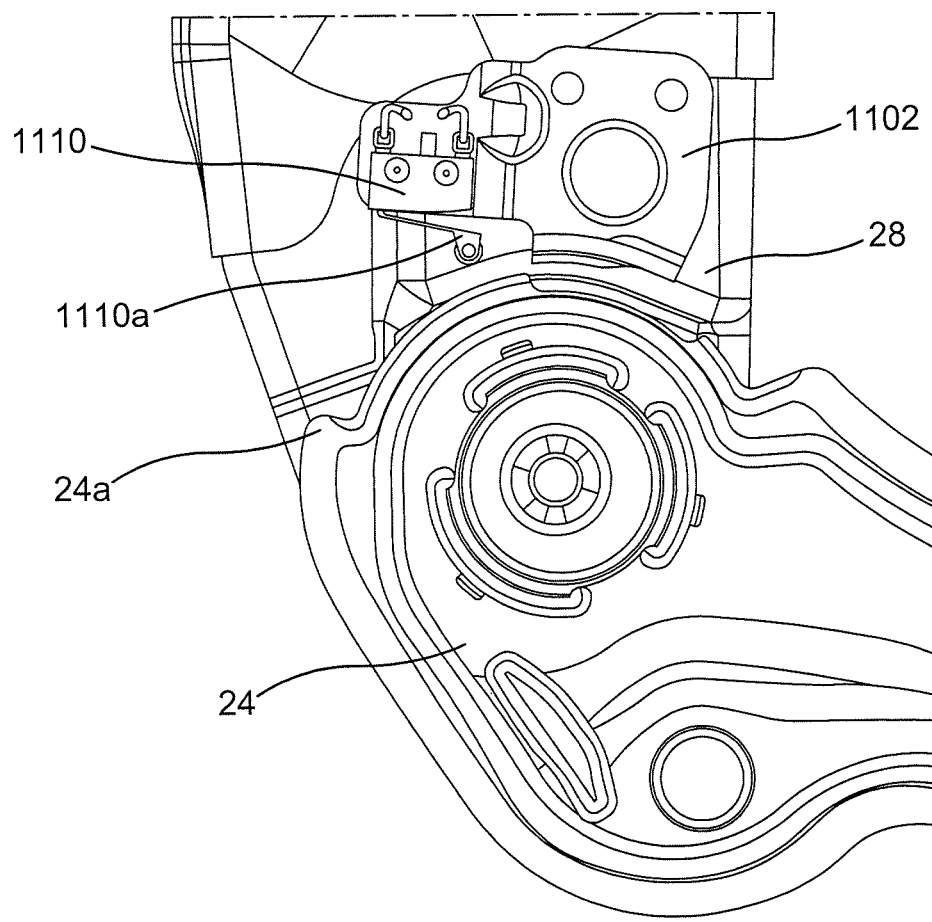
Figure 12:
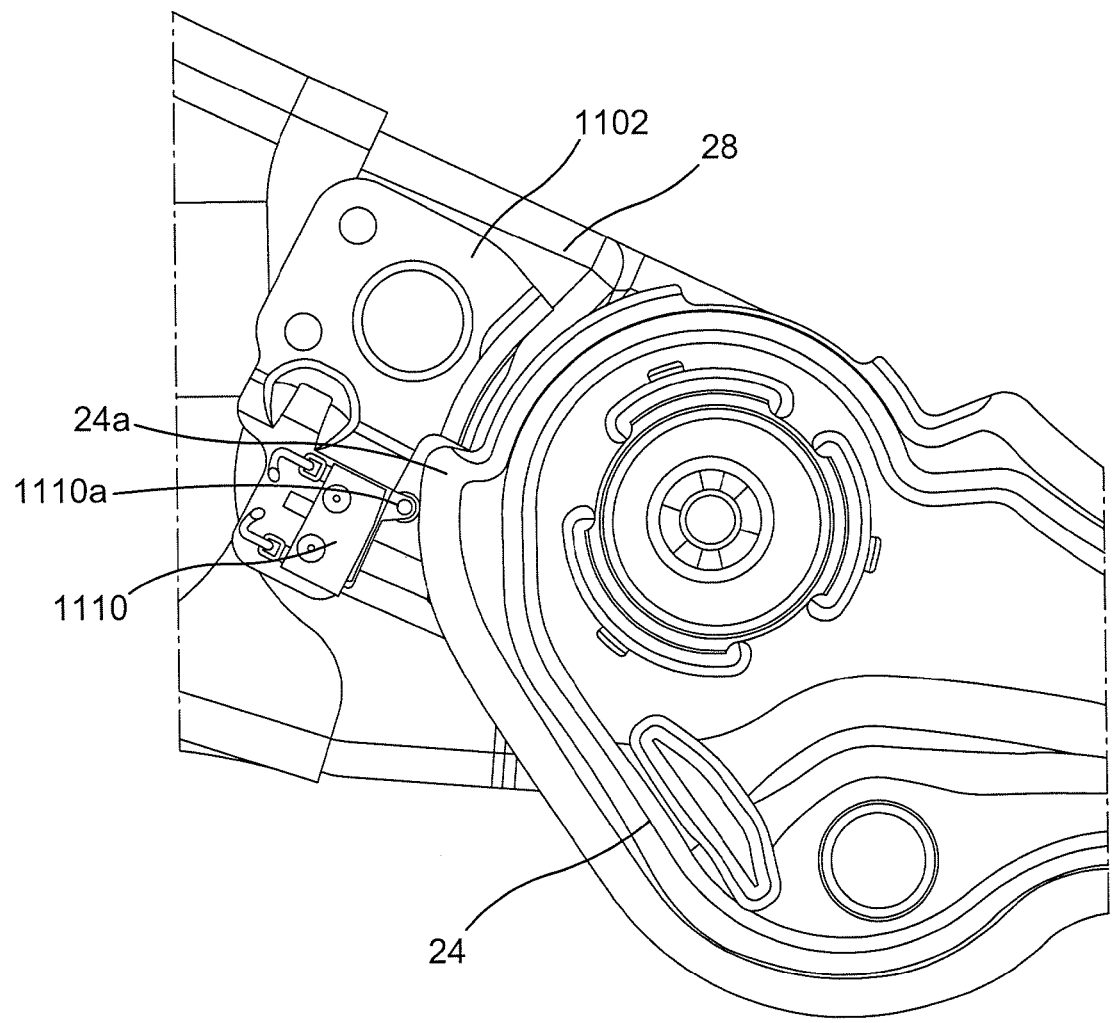
Figure 13:
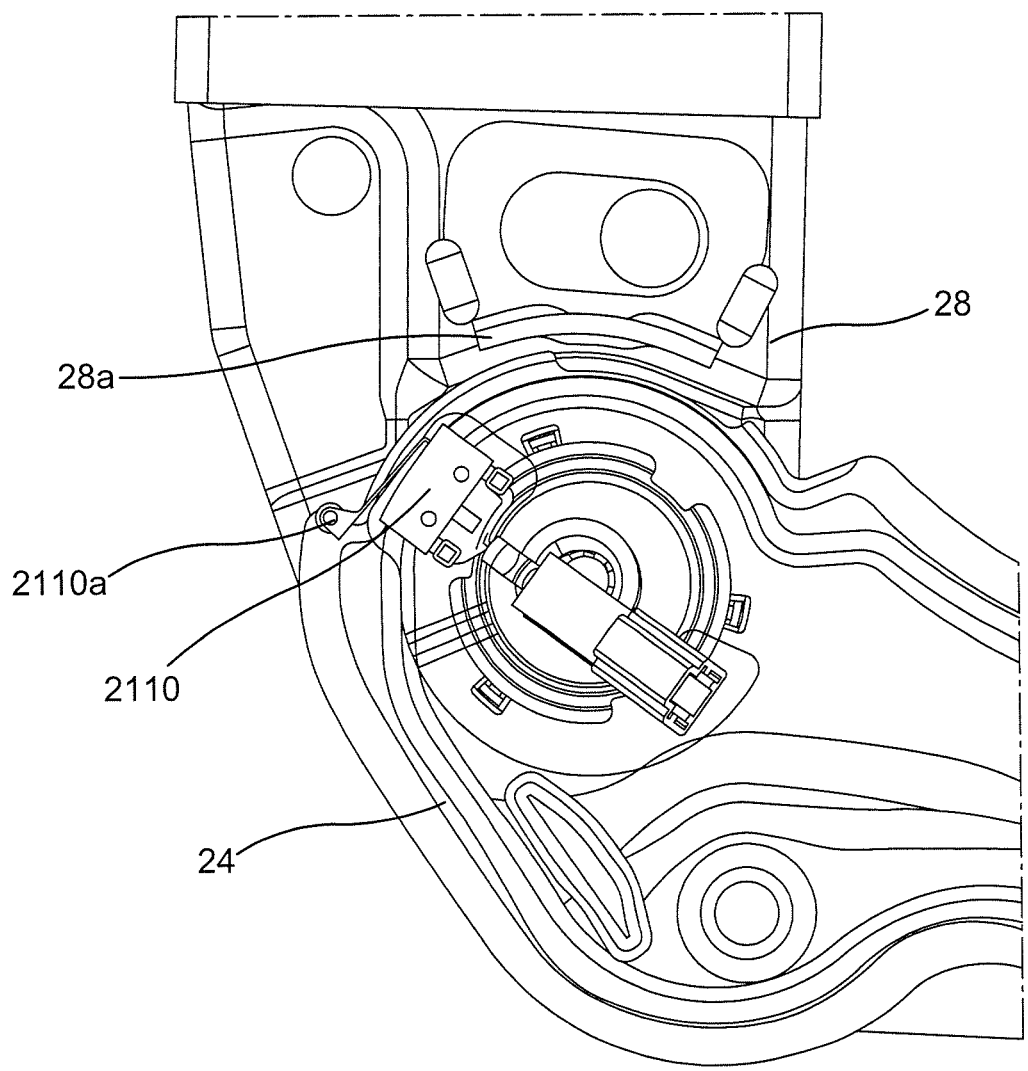
Figure 14:
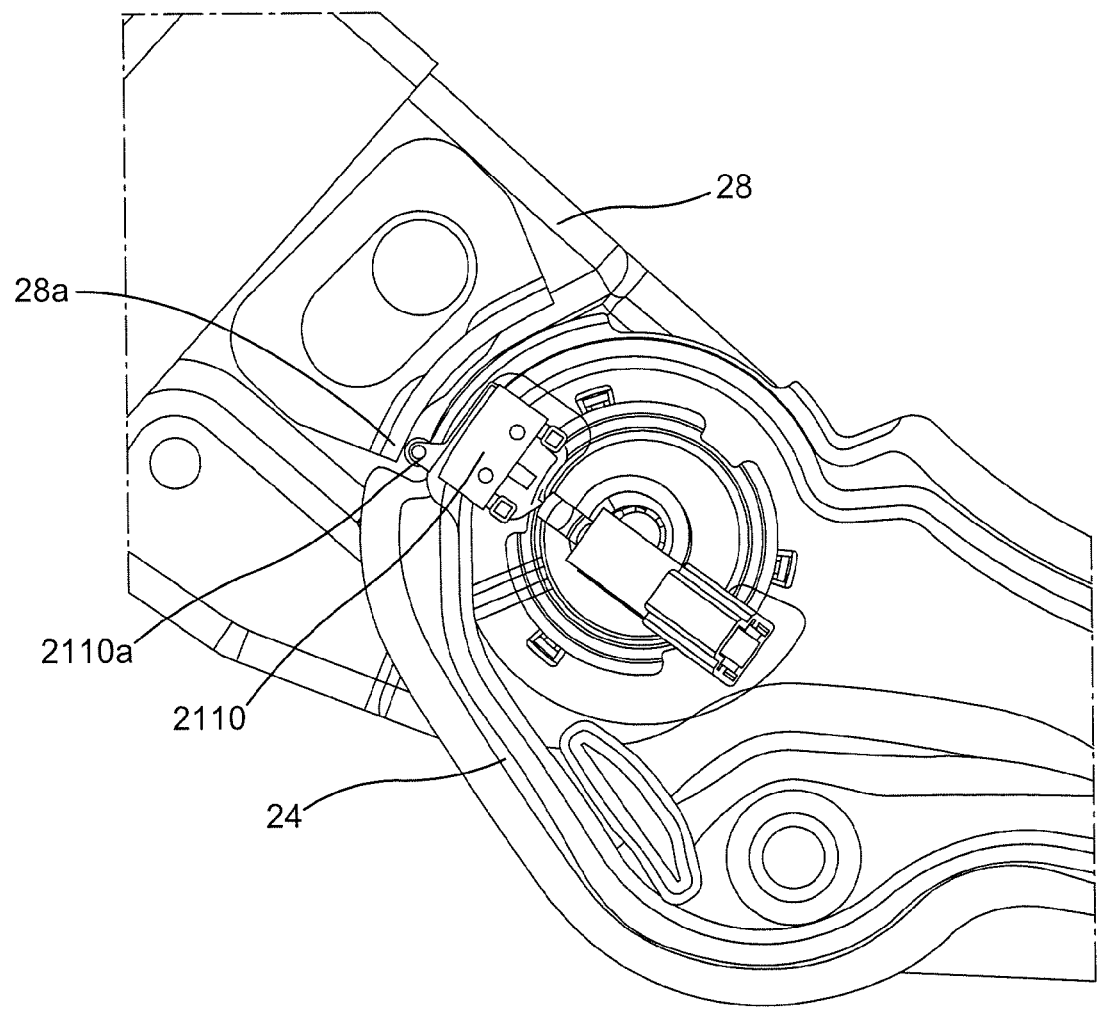
Figure 15:
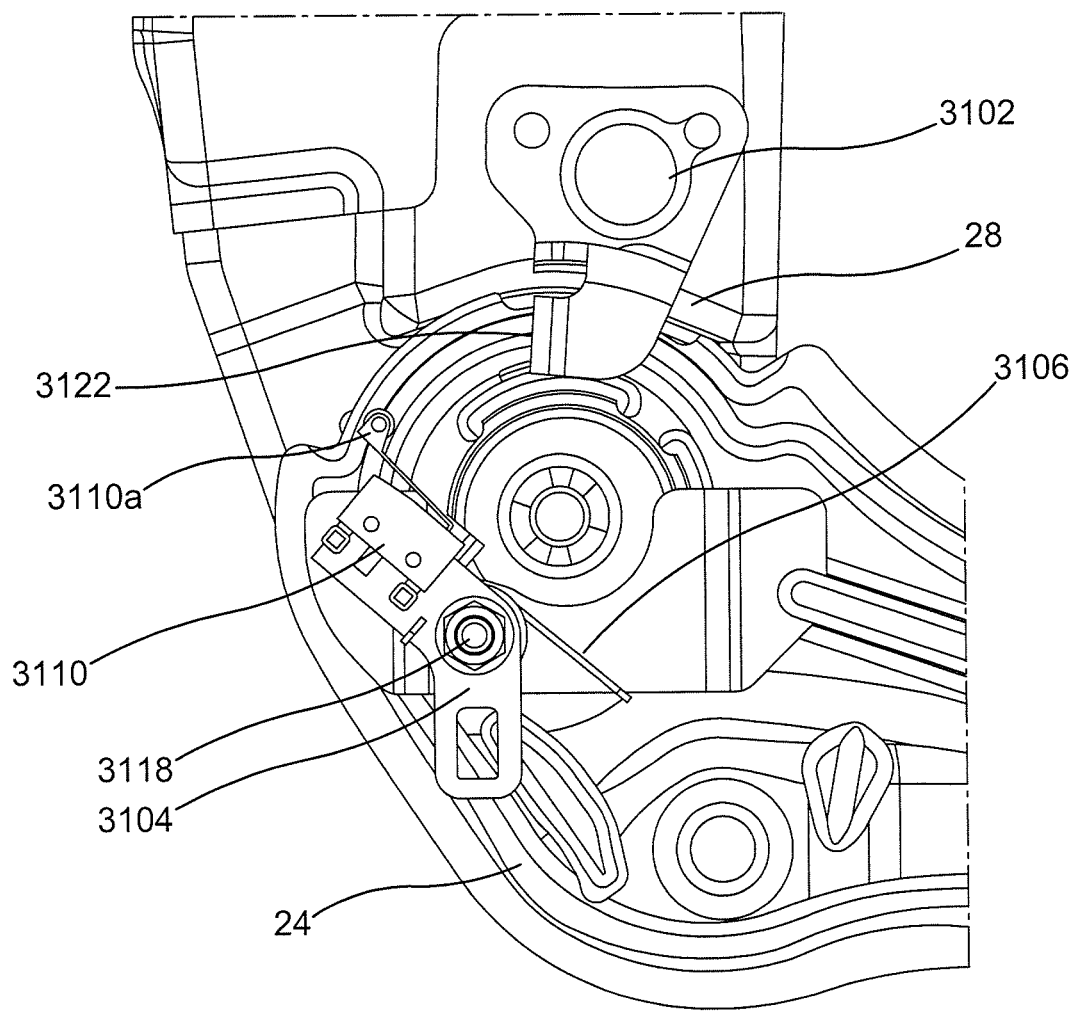
Figure 16:
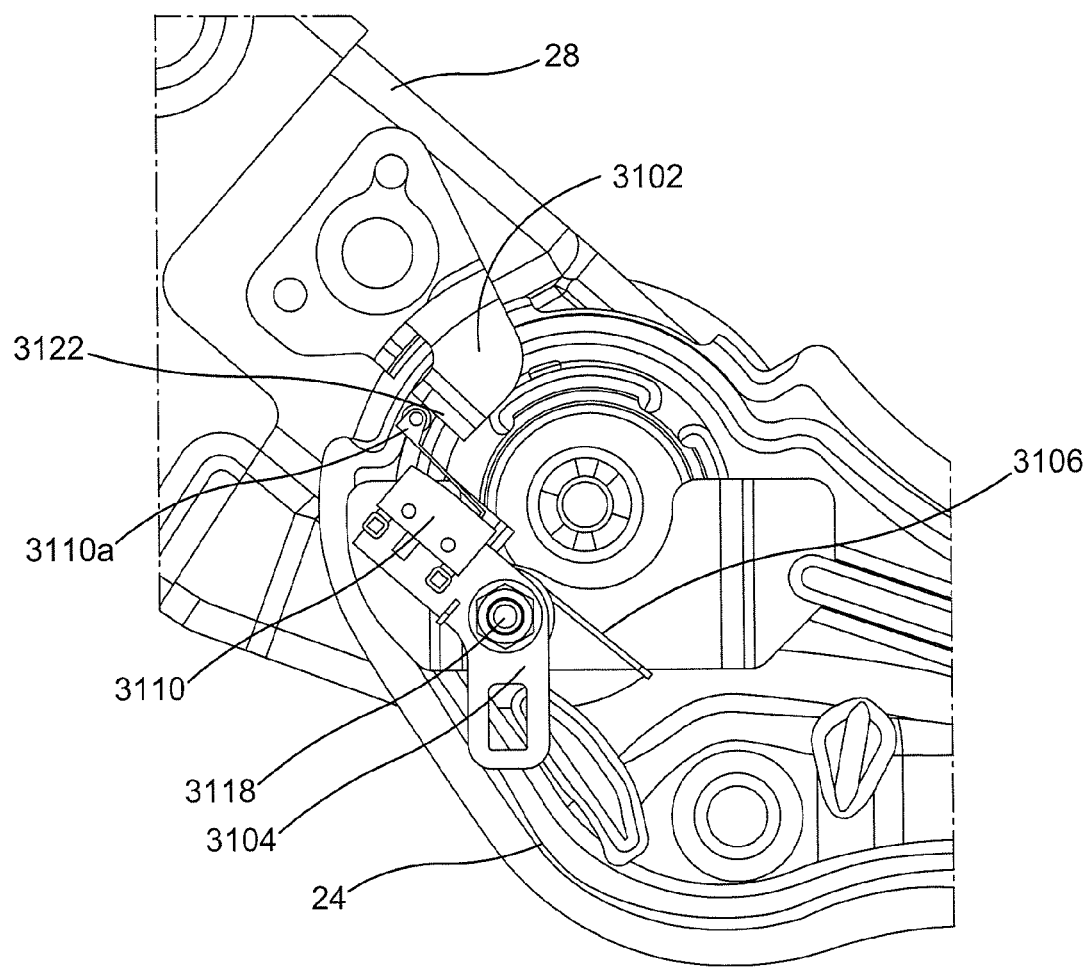
Figure 17:
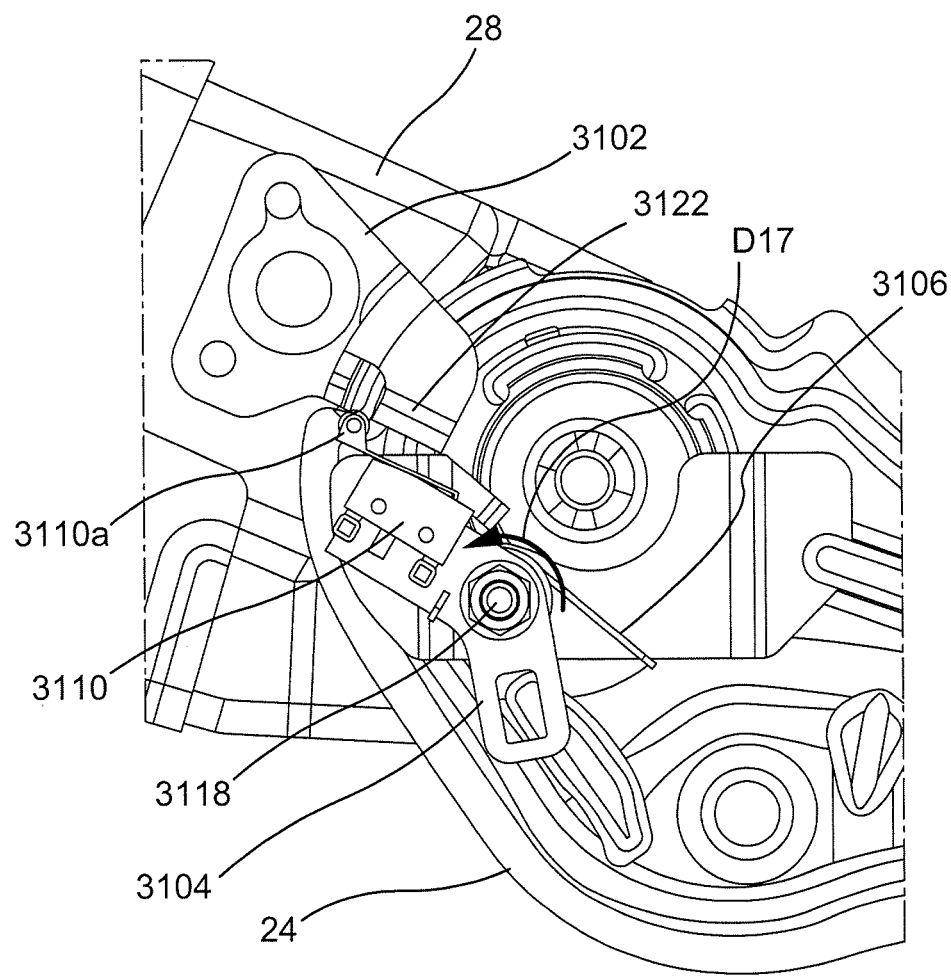

FIG. 9D shows a representative view of a fourth operational state of the circuit of FIG. 9, showing a third circuit path during forward inclined operation of the seat being initiated;

FIG. 9E presents a representative view of a fifth operational state of the circuit of FIG. 9, wherein, following the operational state of FIG. 9D commencing, a fourth circuit path causes operation of the motor in a first direction, so as to cause recline operation of the seat;

FIG. 10 contains an example flowchart of a method of operation of a seat having a limit switch assembly in accordance with aspects of the present disclosure;

FIG. 11 shows a first view of a first alternative location for a limit switch and operation thereof, in accordance with aspects of the present disclosure;

FIG. 12 shows a second view of the first alternative location for a limit switch of FIG. 11, and operation thereof;

FIG. 13 shows a first view of a second alternative location for a limit switch and operation thereof, in accordance with aspects of the present disclosure;

FIG. 14 shows a second view of the second alternative location for a limit switch of FIG. 13, and operation thereof;

FIG. 15 shows a first view of a third alternative location for a limit switch and operation thereof, in accordance with aspects of the present disclosure;

FIG. 16 shows a second view of the third alternative location for a limit switch of FIG. 15, and operation thereof; and FIG. 17 shows a third view of the third alternative location for a limit switch and operation thereof, in accordance with aspects of the present disclosure.

DETAILED DESCRIPTION

Aspects of the present disclosure include a seat for a vehicle, including a seat bottom frame, a seat back frame rotatably coupled with the seat bottom frame and a limit switch assembly. The limit switch assembly includes a limit switch configured to prevent rotation of the seat back when the limit switch is opened, a link moveable from a first position in which the limit switch is closed to a second position in which the limit switch is open, and a bias member, such as a spring, configured to impart a bias force on the link in a direction toward the first position.

Other aspects of the present disclosure provide a method of reclining a seat for a vehicle, the seat including a seat bottom frame, a seat back frame rotatably coupled with the seat bottom frame, and a limit switch assembly, the limit switch assembly including a link, a limit switch, and a bias member, such as a spring. The method includes rotating the seat back frame in a rearward direction, and moving the link from a first position to a second position, including overcoming a bias force imparted by the bias member on the link in a direction toward the first position. The movement of the link from the first position to the second position opens the limit switch, thereby preventing further rotation of the seat back frame in the rearward direction.

Referring now to the drawings, what is shown therein is for purposes of illustrating one or more example aspects of the disclosure, and not for purposes of limiting the same.

Figure 1:
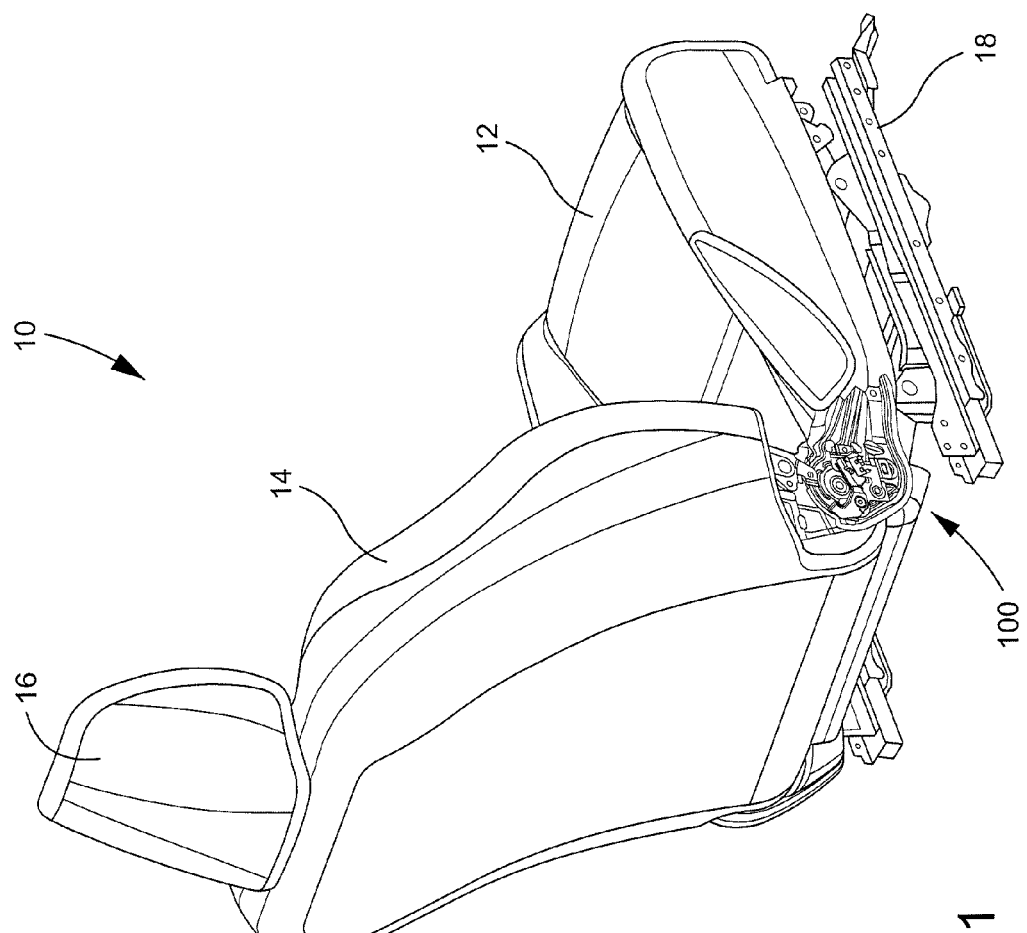
FIG. 1 illustrates an example side perspective view of a seat in a fully upright position in accordance with aspects of the present disclosure.
Figure 2:
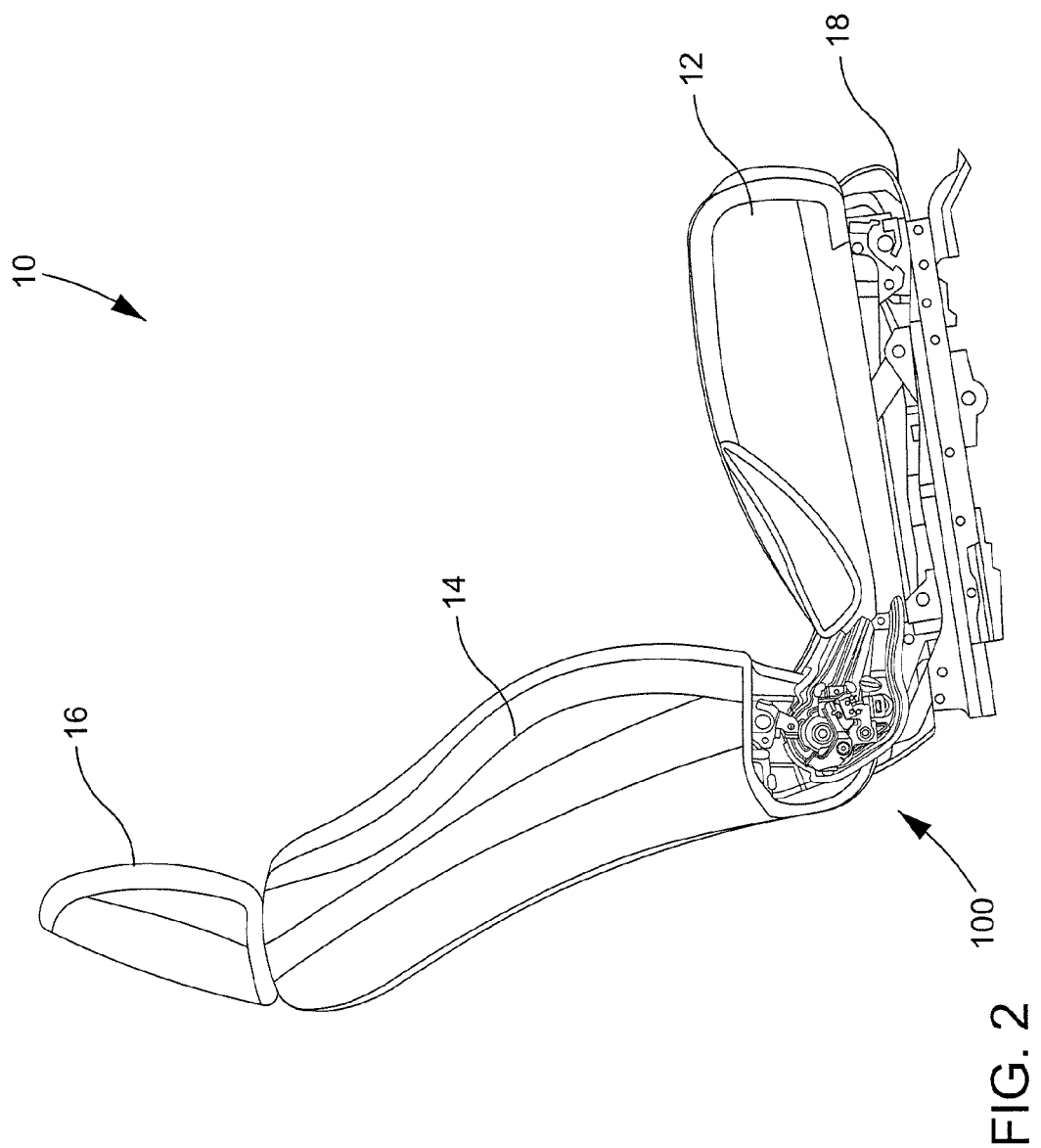
FIG. 2 shows an example side view of the seat of FIG. 1 in the fully upright position in accordance with aspects of the present disclosure.
Figure 3:
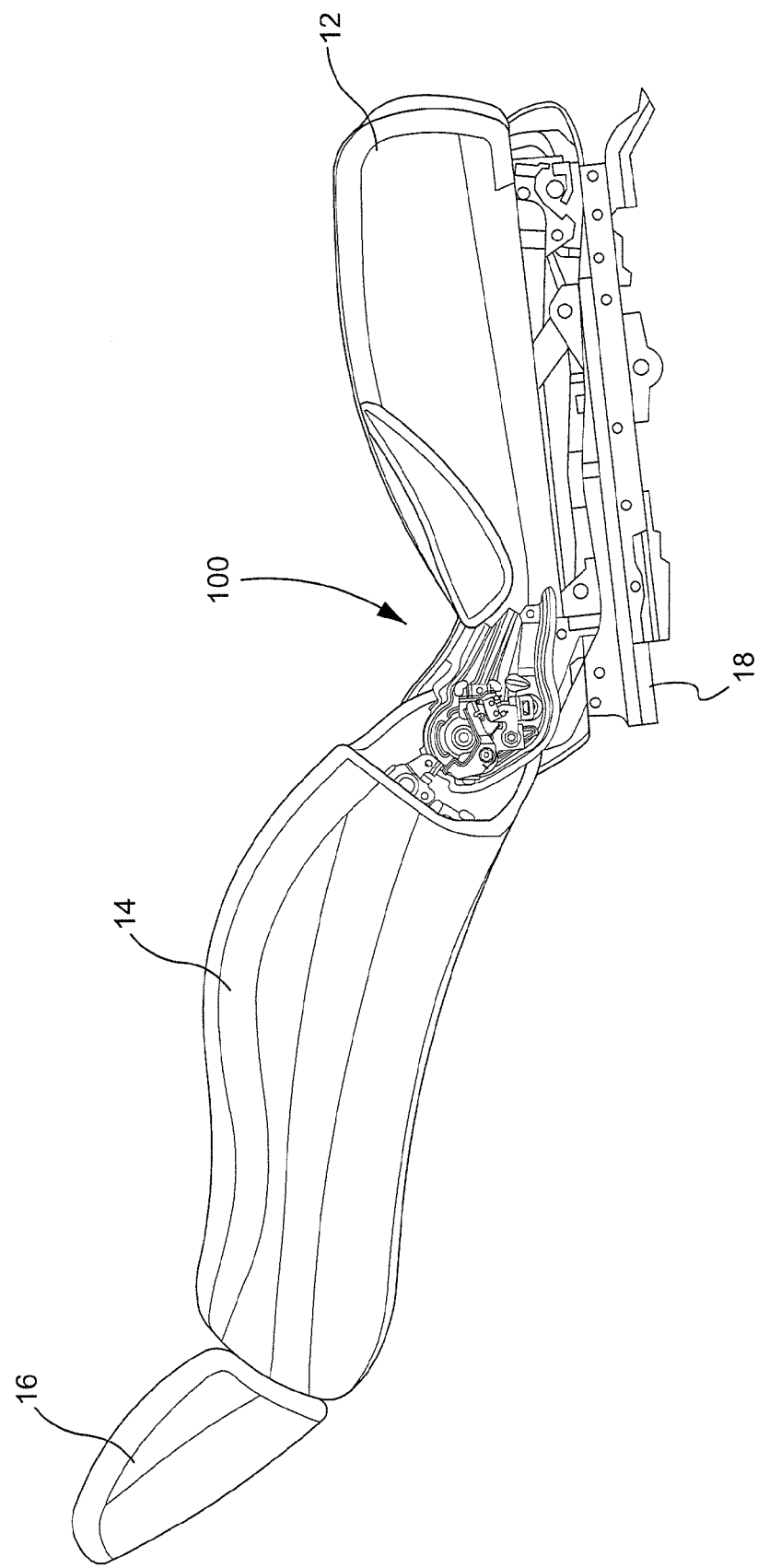
FIG. 3 shows an example side view of the eat of FIG. 1 in a fully reclined position in accordance with aspects of the present disclosure.

As shown in FIGS. 1-3, a seat 10 may include a seat bottom 12, a seat back 14, a head rest 16, and a limit switch assembly 100. The seat 10 may include a mounting frame 18, among other features not shown (e.g., a seatbelt mechanism).

Figure 4:
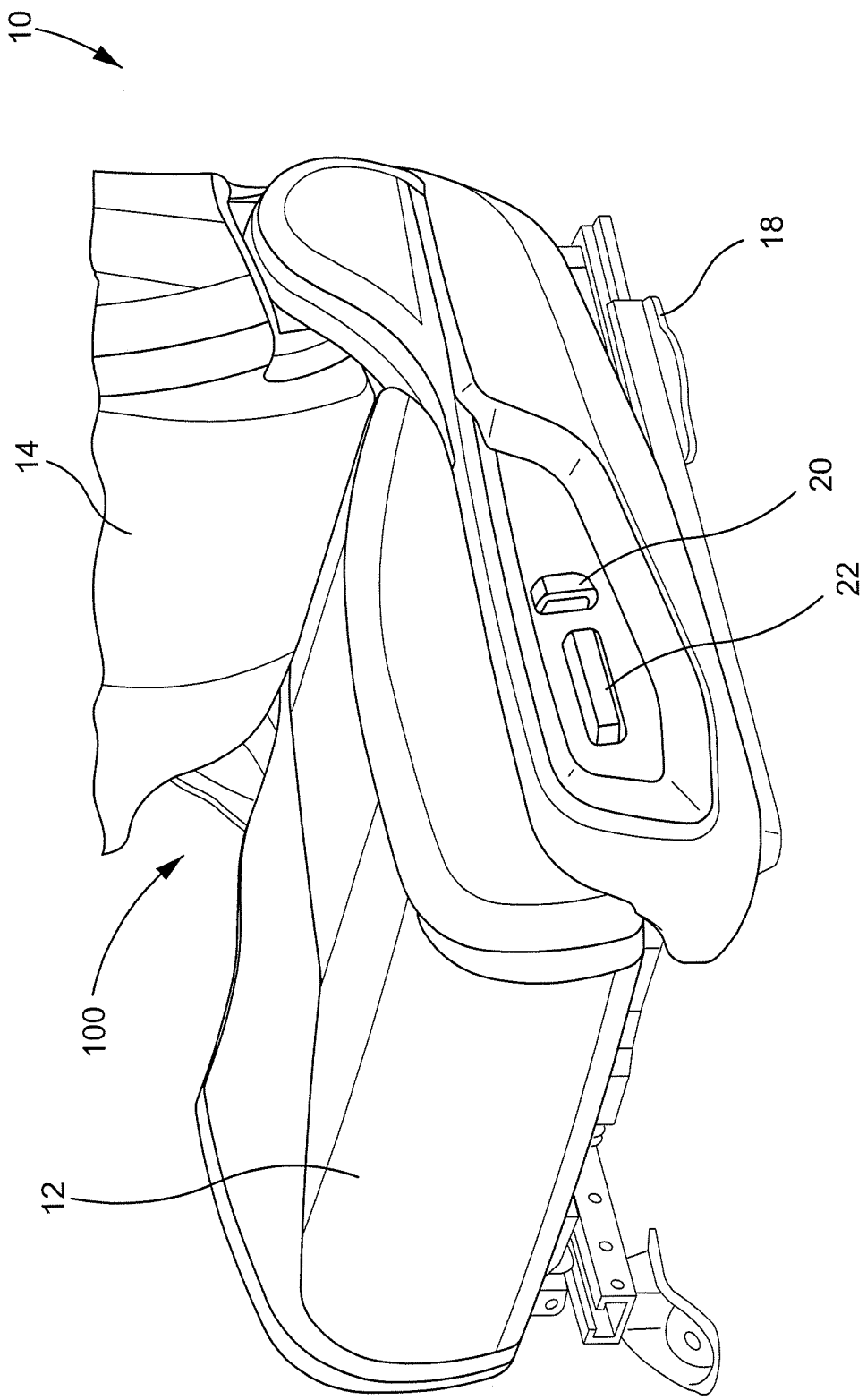
FIG. 4 shows an example opposite side perspective view of the seat of FIG. 1 in a fully upright position in accordance with aspects of the present disclosure.

As shown in FIG. 4, the seat 10 may include a recline switch 20, to be actuated by the user when reclining or returning toward the forward position (also interchangeably referred to as "inclining") of the seat back 14 is desired. The seat 10 may further include a second switch 22 for controlling other seat position aspects, such as forward/rearward position and/or the height of the seat 10 relative to the steering wheel, for example. The details of the aspects of the seat 10 not relating to the limit switch assembly 100 have been omitted for conciseness purposes. However, it should be understood that the seat 10 may include any known features relevant in the art of vehicle seats. The seat 10 may be included as part of a vehicle. The vehicle may also include a plurality (e.g., two or more) of the seats 10. The vehicle may be any vehicle, including, for example, 2-door/4-door passenger cars (two seat, four seat, etc), pickup trucks, vans, aircraft, multipurpose utility vehicles (MUV), or side-by-side all-terrain vehicles, and the like.

Figure 5:
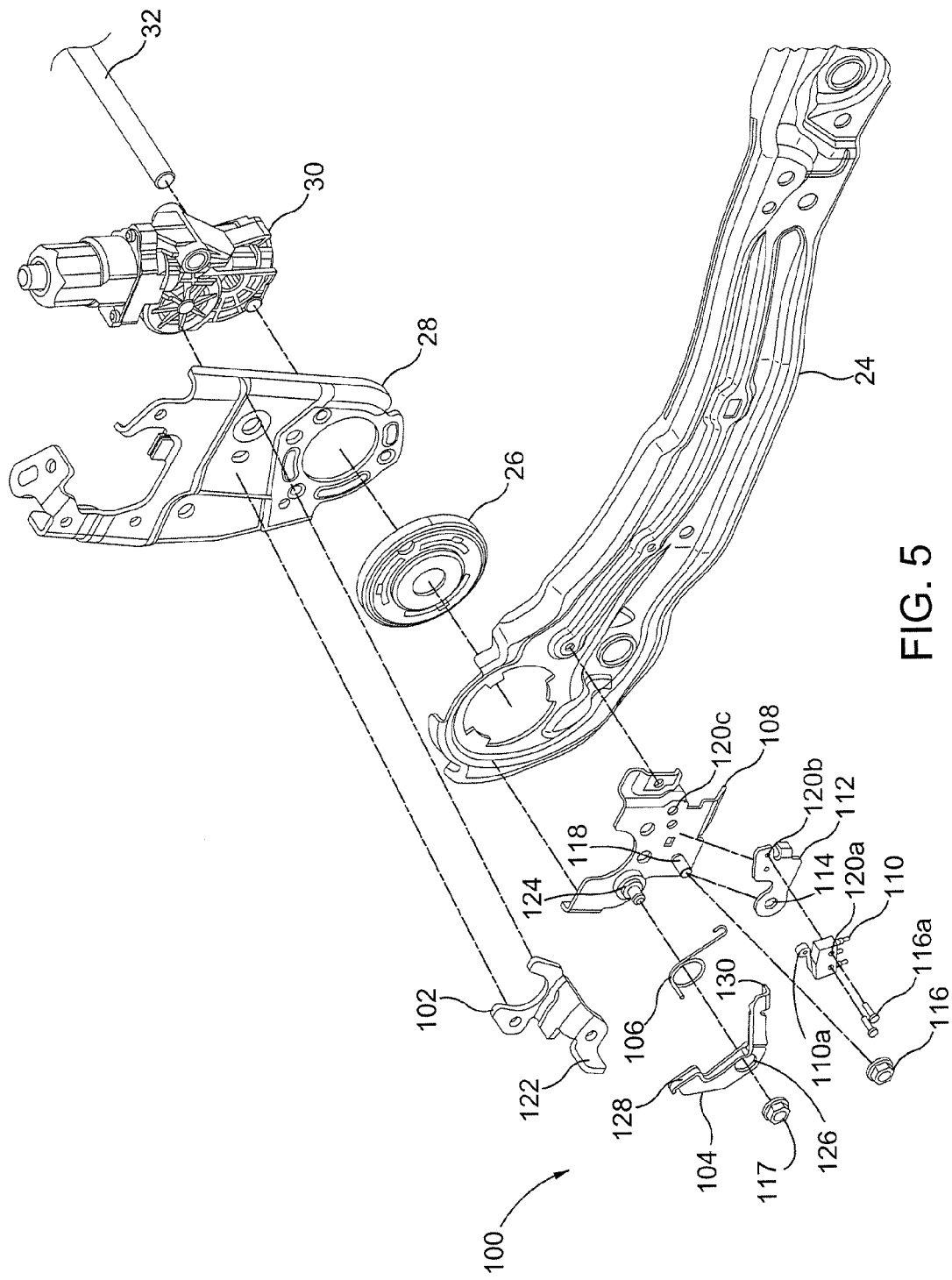
FIG. 5 shows an example exploded view of a limit switch assembly and related operational features in accordance with aspects of the present disclosure.

FIG. 5 shows an example exploded view of the limit switch assembly 100, among other features relating to the reclining of the seat back 14 of FIGS. 1-4. Although described herein as included within the seat reclining mechanism (e.g., recline switch 20 of FIG. 5), it is contemplated that limit switch assembly 100 may be included within a mechanism for adjusting any portion of the seat 10.

As shown in FIG. 5, the limit switch assembly 100 may include a back bracket 102, a link 104, a bias member 106 (e.g., a torsion spring), a switch bracket 108, a limit switch 110, a switch holder 112, and a plurality of securing members 116, 116a, 117 (e.g., screws, rivets, and/or nuts and bolts). As further shown in FIG. 5, additional features that allow for the mounting of the limit switch assembly 100 may include a seat bottom frame 24, a recliner 26, a seat back frame 28, a motor 30 for powered control of seat movement, and a shaft 32 (e.g., which may be operatively coupled to the motor 30 to enable movement of the seat back, such as via rotation of the motor 30 relative to shaft 32). The seat bottom frame 24 may be the frame of the seat bottom 12 (FIGS. 1-4) and the seat back frame 28 may be the frame of the seat back 14 (FIGS. 1-4). As shown in FIGS. 1-4, a cushion material and fabric, leather or other cover may be mounted to the frame to form the completed seat. Any suitable material known in the art may be used for the cushion material and fabric/leather cover. That is, any conventional upholstery may be used to complete the seat 10 (FIGS. 1-4).

Figure 6:
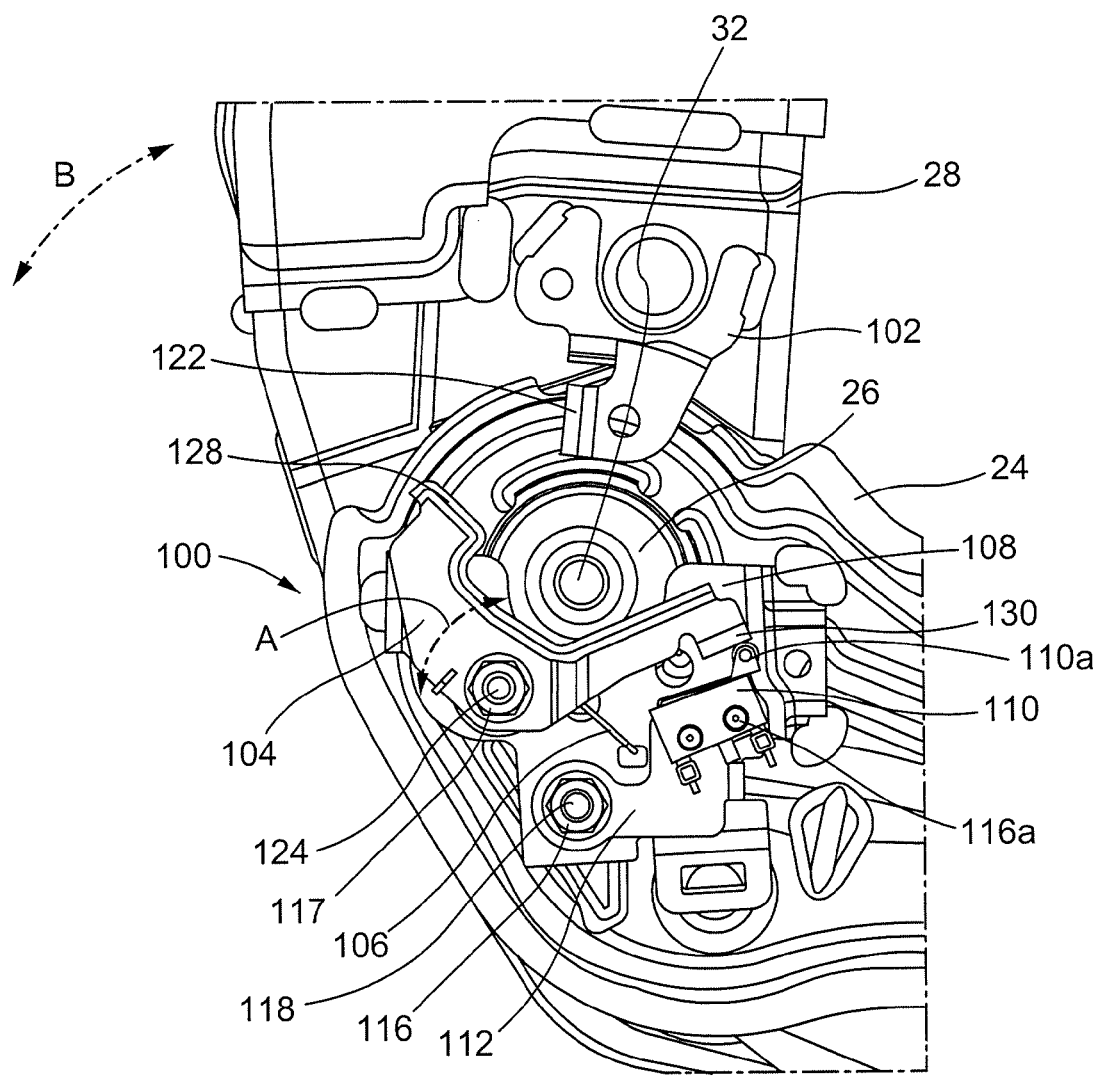
FIG. 6 shows an example partial close up side view of a limit switch assembly and related operational features in a fully upright position in accordance with aspects of the present disclosure.
Figure 7:
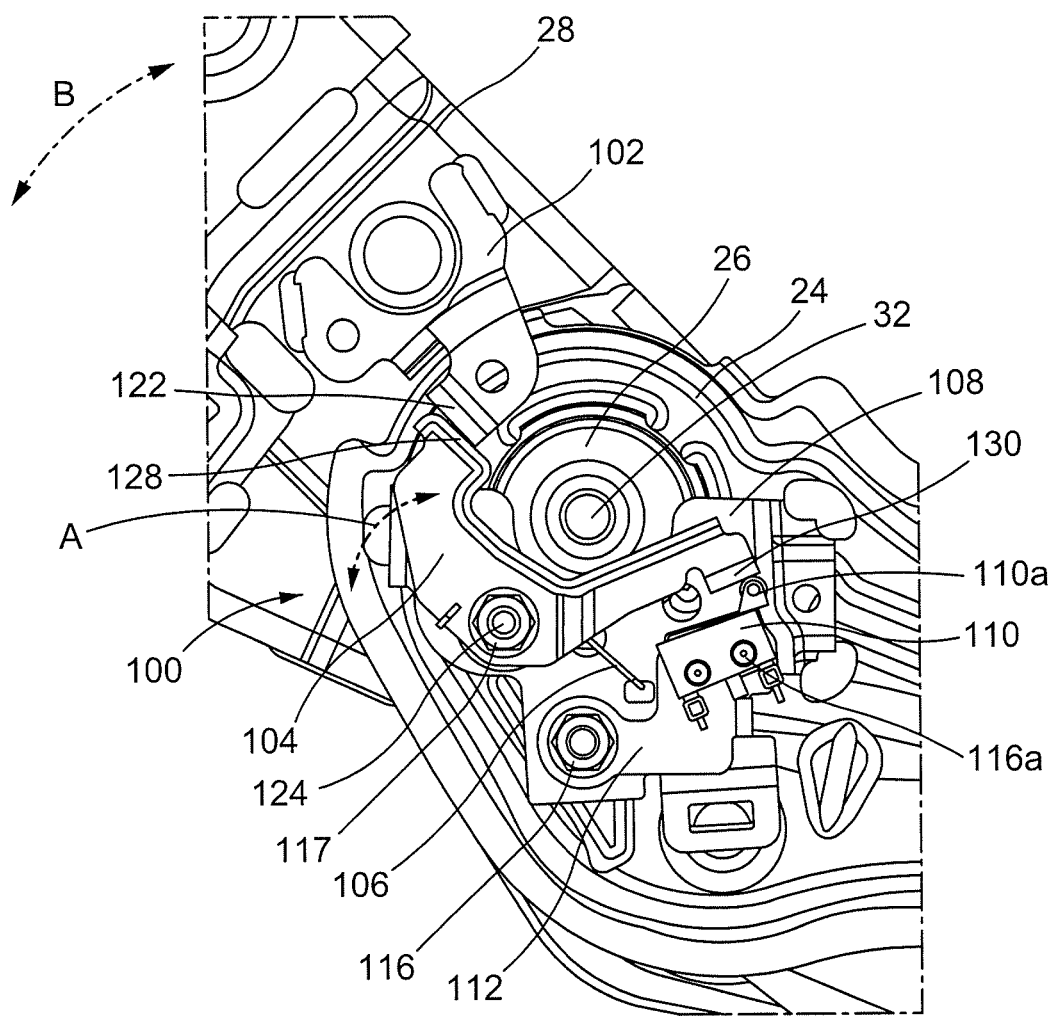
FIG. 7 shows an example close up side view of the limit switch assembly and related operational features of FIG. 6 in a fully reclined position just before the switch opened in accordance with aspects of the present disclosure.
Figure 8:
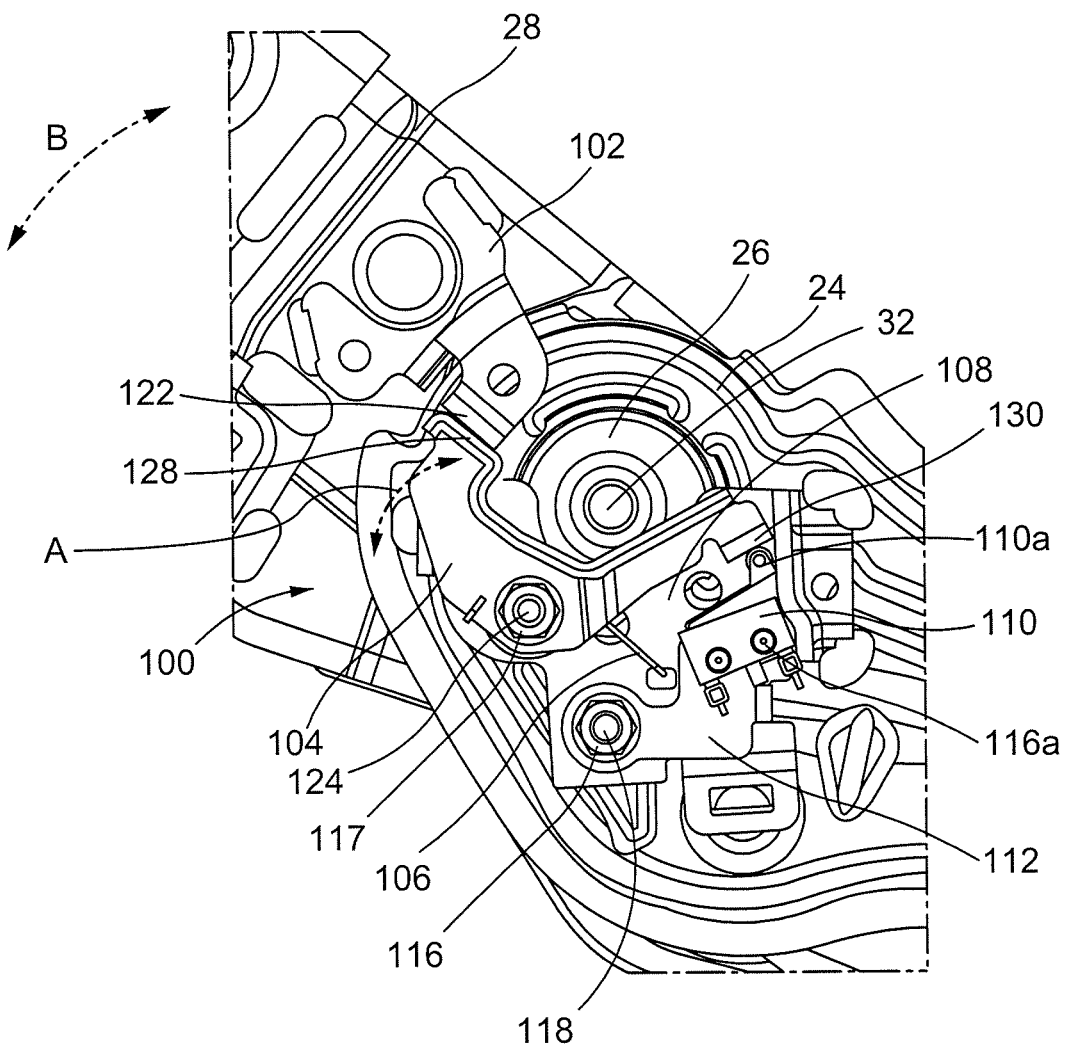
FIG. 8 shows an example close up side view of the limit switch assembly and related operational features of FIG. 6 in a fully reclined position with the switch opened in accordance with aspects of the present disclosure.

FIGS. 6-8 show example assembled side views of the limit switch assembly 100 and other features related to the reclining of the seat back 14 (FIGS. 1-4) in several different orientations. FIG. 6 shows the fully upright orientation of various components of the seat 10 (FIGS. 1-4). FIG. 7 shows a nearly complete reclining position of the seat 10 of FIG. 4, and FIG. 8 shows the seat 10 (of FIGS. 1-4) in the most reclined position, with the limit switch 110 being opened.

Referring to FIGS. 5-8, the back frame 28 may be rotationally coupled to the seat frame 24 via the recliner 26. The seat frame 24 may be rotationally stationary relative to rotation of the back frame 28 in angular directions B about shaft 32, and the back frame 28 may be rotatable about shaft 32 in directions B relative to the seat frame 24. The motor 30 (FIG. 5) may be coupled to the back frame 28. The shaft 32 may be operatively coupled to the motor 30, so as to enable the motor 30 (FIG. 5) to rotate about shaft 32 (e.g., with back frame 28 in directions B as shown in FIGS. 6-8), along with rotation therewith of the recliner 26 when the motor 30 is actuated. Thus, when the motor 30 (FIG. 5) is actuated, for example, through the use of switch 20 (FIG. 4), the motor 30 (FIG. 5) may impart rotation of the motor 30

(FIG. 5) and the attached back frame 28 and recliner 26, relative to the shaft 32, in directions B, as shown in FIGS. 6-8. For example, actuation of the motor 30 (FIG. 5) may recline the seat back 14 (FIGS. 1-4) counterclockwise in direction B (i.e., to the left in direction B as shown in FIGS. 6-8).

The back bracket 102 may be fixedly coupled to the back frame 28. The back bracket 102 may include an end face 122 at an end of the bracket 102. Because the back bracket 102 may be fixedly coupled with the back frame 28, rotation of the back frame 28 in directions B may carry the back bracket 102 along the same rotational motion path in directions B as the corresponding portion of the back frame 28 to which the back bracket 102 is attached. The switch bracket 108 may be fixedly coupled to the seat frame 24. Because the switch bracket 108 may be fixedly coupled with the seat frame 24, the switch bracket 108 may remain rotationally stationary in directions B relative to the back frame 28 and the back bracket 102. The switch holder 112 may be fixedly coupled with the switch bracket 108. In the example aspects shown in FIGS. 5-8, the switch holder 112 may include an opening 114 (see FIG. 5), and the switch bracket 108 may have an extension 118 that extends through the opening 114. Securing member 116 (e.g., a nut) may mate with the extension 118 (e.g., via threading on exterior of extension 118), to secure the switch holder 112 to the switch bracket 108. Because the switch holder 112 may be fixedly coupled with the switch bracket 108, the switch holder 112 may remain rotationally stationary in directions B relative to the back frame 28 and the back bracket 102. The limit switch 110 may be fixedly coupled to switch bracket 108 via the switch holder 112. The limit switch 110, the switch holder 112, and the switch bracket 108 may each include one or more openings 120a, 120b, 120c (FIG. 5) for receiving one or more securing members 116a (e.g., screws, nuts and threaded extensions, or other attachment features). Because the limit switch 110 may be fixedly coupled with the switch holder 112 and the switch bracket 108, the switch 110 may remain rotationally stationary in directions B relative to the back frame 28 and the back bracket 102.

The limit switch 110 may be configured such that a switch trigger 110a on the limit switch 110 is biased toward an open circuit position (see further description of circuit and operation thereof shown and described with respect to FIGS. 9-9E below) when no force is being applied to close switch trigger 110a. For example, the limit switch 110 may include a limit switch biasing member for interacting with switch trigger 110a, thereby imparting a bias on the switch trigger 110a to an open circuit position (e.g., such bias may be imparted via a spring or other feature interacting with switch trigger 110a, such as an extending arm, which may bias the switch trigger 110a to an extended position, wherein the switch trigger 110a opens a circuit in the extended position; or, alternatively, for example, the arm itself may have spring-like properties, such that the switch trigger 110a is biased thereby to extend to an open circuit position). Thus, when no force (or insufficient force to overcome the bias on the switch trigger 110a) is being applied to the switch trigger 110a, the limit switch 110 may automatically cause the circuit to remain open.

The link 104 may be coupled so as to pivot about a point (e.g., projection 124) of switch bracket 108, such as in angular directions A. The link 104 may include a first end face 128 at one end of the link 104 that is configured to be acted upon by the end face 122 of the back bracket 102 in certain positions. The link 104 may include a second end face 130 at a second end that may be configured to act upon the switch trigger 110a of the limit switch 110 in certain positions. The switch bracket 108 may include a projection 124 that may be configured to pass though an opening 126 (FIG. 5) of the link 104. The link 104 may be rotatable about the projection 124 in directions A and may be secured via a securing member (e.g., nut 117). A biasing member 106 (e.g., a torsion spring), may be coupled with the projection 124 and the link 104 to bias the link 104 to a predetermined relative rotation orientation about projection 124 (e.g., counterclockwise to the left in direction A as shown in FIGS. 6-8). In an example aspect, the bias member 106 may bias the link 104 to the position shown in FIG. 6 when the back frame 28 is in the position shown in FIG. 6, as discussed in more detail below. Because the link 104 may be rotationally coupled to the switch bracket 108 via the projection 124, the link 104 may rotate about projection 124 counterclockwise in direction A as shown in FIGS. 6-8 when sufficient force is applied so as to overcome the biasing force imparted by the bias member 106, as also discussed further below.

FIG. 9 shows an example circuit diagram for a circuit 900 for controlling a seat (e.g., seat 10 of FIGS. 1-4), in accordance with aspects of the present disclosure. FIGS. 9A-9E representatively show circuit activity in accordance with various operations of the circuit 900 of FIG. 9, during operation of various features of seat back control in accordance with aspects of the present disclosure.

As shown in FIG. 9, the example circuit 900 includes voltage 901 and ground 902, and a switch operation component 910, which may include a forward switch 912 and a reverse switch 914. Such switch operation component 910 may be included, for example, in switch 20 of FIG. 4. As shown in FIG. 9, each switch 912, 914 may be placed in a first (e.g., not operated or closed to ground) position, as shown in solid line in switches 912, 914, or a second (e.g., operated or closed to voltage) position, as shown in dotted line in switches 912, 914. The circuit 900 also includes a relay box 920, having two relays 922 and 924, and a limit switch 930. The limit switch 930 may be included within, for example, switch 100 and switch trigger 110a of FIGS. 5-8. The relays 922, 924 may each include an inductance operated switch component 922a, 924a, each having a first position, as shown in solid line, and a second position, as shown in dotted line. Further shown in FIG. 9 are a motor 940, which may be included, for example, in motor 30 shown in FIG. 5.

Operation of the circuit 900 is further described in conjunction with FIGS. 9A-9E. In FIG. 9A, in a first operational state, rear recline operation is shown, such as relating to the operation of a rearwardly reclining seat (corresponding to, for example, as shown with respect to FIGS. 6-8 and described in conjunction therewith). As shown in FIG. 9A, in this first operational state, upon the closing of switch 914 (e.g., corresponding to switch 20 of FIG. 4 being activated to recline seat 10), because the recline limiting switch 930 is also closed (corresponding to limit switch 110 and switch trigger 110a being in the closed position as shown in FIGS. 6 and 7), the circuit path P1 is completed, and, in turn, at the moment of such circuit P1 being completed, switch 924a is caused to move to the position shown in FIG. 9A (via inductance) thereby closing the upper path in the circuit portion of relay 924, as shown. Closing the upper path of switch 924a causes the circuit path P2 to thereby also be completed, as shown in FIG. 9B, in turn causing operation of the reclining motor 940 in first direction D1 (e.g., to cause reclining of the seat, such as to the position shown in FIG. 7).

Upon switch 930 opening (e.g., the back frame 28 of FIG. 8 reaching the position shown in FIG. 8, so as to cause the limit switch 110 to open via movement of back bracket 102 and impacting face 122 via movement of back frame 28 as shown in FIG. 8, thereby lifting second end face 130 from the switch trigger 110a), circuit path P1 of FIG. 9B is opened, thereby also opening circuit path P2 of FIG. 9B, since switch 924a moves to the lower path position, as shown in FIG. 9C. Note that, although the recline switch 914 may be in the operational position as shown in FIG. 9C, because switch 930 is open, motor 940 does not operate.

Although the motor 940 cannot operate for recline operation in the position shown in 9C (e.g., so as to recline the seat further, as shown in FIG. 8), note that, even with switch 930 in the open position, upon the switch 912 being activated (e.g., for seat incline function, as described in conjunction with FIGS. 6-8), as shown in FIG. 9D (note that, optionally, switch 914 may be deactivated automatically with activation of switch 912, as shown in FIG. 9D), circuit path P3 is completed, and switch 922a is caused to be activated to a first position, so as to close the upper path, as shown in FIG. 9D. Upon activation of switch 912, circuit path P4 is completed, as shown in FIG. 9E, thereby causing the motor 940 to rotate in the direction D2 (e.g., opposite direction to D1, for example, so as to cause incline of the seat, rather than recline). Note further that circuit P4 is completed as shown in FIG. 9E, regardless of the position of switch 930 (assuming switch 914 is in the position shown in FIG. 9D).

Reclining operation will now be further described with respect to FIGS. 1-8, in view of the operation of circuit 900 of FIGS. 9-9E, starting from the fully upright position. Example fully upright positions are shown in FIGS. 1, 2, 4, and 6. In the fully upright position shown in FIG. 6, the back frame 28 is upright as shown, and the link 104 is rotated clockwise in direction A, such that the switch trigger 110a of the trigger switch 110 is placed in a closed position. First end face 128 of the link 104 is at a distance from the end face 122 of the back bracket 102 for this position of back frame 28. In this position, no force is applied on the first end face 128 of the link 104 by the end face 122 of the back bracket 102. When no force is applied on the first end face 128 of the link 104 in counterclockwise direction A, as shown in FIGS. 6-8, about the projection 124, the biasing member 106 (e.g., a torsion spring) biases the link 104 in a clockwise direction A about the projection 124.

Counterclockwise rotation in direction B, as shown in FIGS. 6-8, of the back frame 28 about shaft 32 as shown in FIGS. 6-8 provides rearward reclining, while corresponding clockwise rotation in direction B about shaft 32 of the back frame 28 reduces the amount of recline by moving toward the upright position and/or forward thereof (also referred to as inclining the seat). The clockwise bias in direction A imparted by the bias member 106 on the link 104 as shown in FIG. 6 causes the second end face 130 of the link 104 to impart a closing force on the switch trigger 110a of limit switch 110.

Since the closing force applied to the switch trigger 110a of the limit switch 110 is provided by the second end face 130 of the link 104, via the bias member 106, the amount of force applied to the limit switch 110 can be predefined. For example, the bias member 106 may be selected such that the amount of force provided by the bias member 106 is less than an amount of force that may damage the switch trigger 110a and/or limit switch 110. Thus, the strength of the bias member may be selected such that the force the bias member 106 will impart on the limit switch 110 will not damage the limit switch 110.

Furthermore, the closing force imparted by the bias member 106 may be greater than the force of the second bias member that biases the trigger switch 110a of the limit switch 110 to the open position. Because the closing force of the bias member 106 may be greater than the force biasing the trigger switch 110a of the limit switch 110 to the open position, the limit switch 110 may be held in the closed position via action of the second end face 130 upon the trigger switch 110a. With the limit switch 110 thereby closed, the circuit may be complete and power may be available to the motor 30 (see circuit operation as shown in FIG. 9B). As long as the limit switch 110 remains closed, when the operator actuates recline switch 20 (FIG. 4) for reclining, the motor 30 operates to cause rearward rotation (counterclockwise rotation in direction B) of the back frame 28 until a maximum position of recline is reached, as shown in FIG. 8.

FIG. 7 shows the position of the seat 10 (FIGS. 1-4) just before maximum reclining position is reached. As the operator continues to actuate recline switch 20 (FIG. 4) for reclining, the back frame 28 may continue to rotate counterclockwise in direction B as shown in FIGS. 6-8. Because the back bracket 102 is fixed to the back frame 28, the continued rotation of the back frame 28 counterclockwise in direction B may also cause the back bracket 102 to rotate counterclockwise in direction B and approach the link 104. As shown in FIG. 7, as the seat approaches the maximum recline, the end face 122 of the back bracket 102 contacts the first end face 128 of the link 104. Up to this point of reclining, no force has been applied to first end face 128 of the link 104, and the second end face 130 of the link 104 continues to maintain the limit switch 110 in the closed position via clockwise force in direction A imparted to the trigger switch 110a by the second end face 130 via bias of the bias member 106 on link 104.

FIG. 8 shows the position at maximum reclining of the seat 10 (FIGS. 1-4). As the user requests more reclining by actuation of the recline switch 20 (FIG. 4) for reclining and the maximum recline is approached, the end face 122 of the back bracket 102 initially contacts the first end face 128 of the link 104, and the back bracket 102 then continues to move in counterclockwise direction B. The back bracket 102 thereby applies a counterclockwise force on the link 104 in direction A via end face 122 action upon first end face 128 of link 104. The continued application of a counterclockwise force in direction A on the link 104 by the back bracket 102 via first end face 128 then causes the second end face 130 of link 104 to lift from the trigger switch 110a of limit switch 110, thereby opening an electrical circuit via opening of limit switch 110 (see circuit activity for opening of switch 930 of FIG. 9C for example electrical circuit operation). With the circuit no longer closed, the motor 30 (FIG. 5) no longer receives power (see, e.g., FIG. 9C and description relating thereto). Thus, even if the operator continues to actuate recline switch 20 (FIG. 5) for the recline operation, the motor 30 (FIG. 5) would not operate, and no further reclining would occur. Thus, further reclining would no longer be possible once the second end face 130 of the link 104 is lifted so as to place the switch trigger 110a of limit switch 110 in the open position.

As shown in FIG. 8, once limit switch 110 has been opened, it will remain open until the operator actuates the recline switch 20 (FIG. 4) so as to move the seat back 14 (FIG. 4) toward the upright position (corresponding to back frame 28 rotating in the clockwise direction B as shown in FIG. 8) until the link 104 returns to the position shown in FIG. 7.

Because of the arrangement of the circuitry for controlling the motor 30 (FIG. 5), as shown, for example, in the circuit operation of FIGS. 9-9E, the operator may still move the seat back 14 (FIG. 4) forward (inclining in clockwise direction B as shown in FIGS. 6-8) even after the limit switch 110 has opened (see also FIG. 9E and description relating thereto). Once the operator actuates switch 20 (FIG. 4) so as to move the seat back 14 (FIG. 4) in an inclined manner toward the upright position (clockwise direction B in FIGS. 6-8), the link 104 may rotate in the clockwise direction A via biasing member 106, as shown in FIGS. 5 and 6, and limit switch 110 may return to the closed position via action of the second end face 130 of link 104 upon switch trigger 110a so as to close limit switch 110, such action thereby again enabling recline operation. As inclination continues, the seatback may return sequentially to the position shown in FIG. 6 and then that of FIG. 5. Note that the operator has the option to attempt to recline again at any time after limit switch 110 is released and returns to the closed position, as shown in FIGS. 5 and 6.

Notably, the above described structure, and in particular the interaction of the link 104 with the switch trigger 110a and limit switch 110 may prevent the back frame 28 or the back bracket 102 from ever directly impacting the switch trigger 110a and/or limit switch 110. During the reclining operation, there is no chance of the switch trigger 110a or limit switch 110 being damaged by an overstroke because the switch trigger 110a only opens as the link 104 is impacted in a direction opposite to the direction of contact with the switch trigger 110a and limit switch 110 (i.e., recline operation causes counterclockwise rotation in direction A of the link 104, thereby moving contacting second end face 130 of link 104 in a counterclockwise direction A away from switch trigger 110a and limit switch 110. During movement toward the upright position, the biasing force of the bias member 106 may always control the amount of force acting to close the limit switch 110 via switch trigger 110a. The amount of force in the bias member 106 may be configured such that it may not be strong enough to damage the limit switch 110, for example.

A method of operation of a seat having a limit switch assembly in accordance with aspects of the present disclosure will now be further described with respect to the flowchart of FIG. 10. As shown in FIG. 10, assuming the seat back is not in the fully reclined position, the method 1000 includes receiving an input to recline the seat back 1005. In the non-fully reclined position, the back frame is not fully reclined (see, e.g., back frame 28 in FIG. 6), and the link (link 104 in FIG. 6) is rotated via a biasing element, such that the trigger switch is placed in a closed position (see, e.g., switch trigger 110a and trigger switch 110 in FIG. 6).

As the recline input continues to be received (e.g., via switch 20 of FIG. 4) the back frame continues to rotate in a recline direction. A back bracket (e.g., back bracket 102 of FIGS. 6-8) fixed to the back frame rotationally travels with the back frame during the reclining motion. As the seat approaches the maximum recline, the back bracket contacts the link 1010. As recline continues, the back bracket applies a force on the link opposite to its biased direction, thereby causing the link to rotate, such that the limit switch opens at maximum recline, thereby opening an electrical circuit 1015 (see circuit activity for opening of switch 930 of FIG. 9C for example electrical circuit operation). With the circuit no longer closed, the motor (e.g., motor 30 of FIG. 5) no longer receives power (see, e.g., FIG. 9C and description relating thereto), and no further reclining would occur 1020.

While the limit switch illustrated and described above is shown as being stationary by being mounted to the switch holder in FIGS. 6-8, the limit switch may instead, in other alternative embodiments, be configured to be moveable so as to provide similar control and limits on recline, without imparting damage on the limit switch. For example, the limit switch may be mounted so as to function similarly from a placement on or attached to the back frame (e.g., back frame 28 as shown in FIGS. 5-8), cushion frame (e.g., cushion frame 24, as shown in FIGS. 5-8), or on a link (e.g., link 104, as shown in FIGS. 5-8).

For example, in a first alternative embodiment, as shown in FIGS. 11 and 12, a limit switch 1110 having a switch trigger 1110a may be mounted to a back bracket 1102. In this aspect, in the non-fully reclined position, the limit switch 1110 would travel with the back bracket 1102 and the back frame 28 during recline of the seat back, with the limit switch 1110 being biased to closed position when the switch trigger 1110a is extended, thereby allowing recline motion by the back frame 28. The switch trigger 1110a would be engaged to the open position upon passing an extension point 24a of the cushion frame 24, as shown in FIG. 12, thereby preventing further recline.

In a second alternative embodiment, as shown in FIGS. 13 and 14, a limit switch 2110 having a switch trigger 2110a may be mounted to the cushion frame 24. In this aspect, in the non-fully reclined position, the limit switch 2110 would be stationary with the switch trigger 2110a being biased to closed circuit position when the switch trigger 2110a is extended, thereby allowing recline motion by the back frame 28. The switch trigger 2110a would be engaged to the open position upon an extension 28a, such as a lip, of the back frame passing the trigger switch 2110a, which would be engaged to the open position by movement toward the trigger switch in response to contact with the extension 28a, as shown in FIG. 14, thereby preventing further recline.

In a third alternative embodiment, as shown in FIGS. 15-17, a limit switch 3110 having a switch trigger 3110a may be mounted to a link 3104 so as to rotate about an extension 3118. The link 3104 may be biased, for example, by a spring 3106 to the position shown in FIG. 15. The switch trigger may be biased to closed circuit position when the switch trigger 2110a is extended, thereby allowing recline motion by the back frame 28. A back bracket 1102 having an end face 3122 may be mounted to the back frame 28. In this aspect, in the non-fully reclined position. The switch trigger 1110a would be engaged to the open position upon being engaged by the end face 3122 of the back bracket 1102, as shown in FIG. 16, thereby preventing further recline. However, in the event of overrun by the seat back, bias-opposed rotation in direction D17 of the link 3104, as shown in FIG. 17 could prevent damage to the switch trigger 3110a and/or limit switch 3110.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:
1. A seat for a vehicle, comprising:
a seat bottom frame;
a seat back frame rotatably coupled with the seat bottom frame; and a limit switch assembly, the limit switch assembly comprising:
a limit switch configured to prevent rotation of the seat back when the limit switch is opened;
a link moveable from a first position in which the limit switch is closed, and in which the seat back frame is upright or forward inclined, to a second position in which the limit switch is open, and in which the seat back frame is reclined; and
a bias member configured to impart a bias force on the link in a direction toward the first position.

2. The seat of claim 1, wherein the limit switch assembly further comprises a back bracket coupled with the seat back frame such that rotation of the seat back frame rotates the back bracket.

3. The seat of claim 2, wherein the limit switch assembly further comprises a switch bracket coupled with the seat back frame, and wherein the link is coupled with the switch bracket.

4. The seat of claim 2, wherein the back bracket comprises a first end face and the link comprises a second end face, and wherein rearward rotation of the seat back frame causes the first end face to impart a force on the second end face.

5. The seat of claim 4, wherein the force on the second end face is imparted in a direction opposite a direction of the bias force imparted by the bias member.

6. The seat of claim 5, wherein the link comprises a third end face contacting the limit switch in the first position.

7. The seat of claim 5, wherein when the force on the second end face is greater than the bias force, the link rotates to the second position.

8. The seat of claim 1, wherein the limit switch is biased to open when the link is in the second position.

9. The seat of claim 8,
further comprising a rotator and a motor,
wherein the seat back frame is rotatably coupled with the seat bottom frame via the rotator,
wherein the actuation of the motor causes rotation of the rotator, and
wherein power is prevented from reaching the motor when the limit switch is opened.

10. The seat of claim 9, further comprising a recline switch, wherein actuating the recline switch in a recline direction when the limit switch is closed actuates the motor, and wherein actuating the recline switch in a recline direction when the limit switch is open does not actuate the motor.

11. The seat of claim 1, wherein the bias member is a torsion spring.

12. A method of reclining a seat for an automotive vehicle, the seat including a seat bottom frame, a seat back frame rotatably coupled with the seat bottom frame, and a limit switch assembly, the limit switch assembly including a link, a limit switch, and a bias member, the method comprising:
receiving an input to rotate the seat back frame in a recline direction; and
in response to the received input, moving the link from a first position, in which the seat back frame is upright or forward inclined, to a second position, in which the seat back frame is reclined, including overcoming a bias force imparted by the bias member on the link in a direction toward the first position,
wherein movement of the link from the first position to the second position opens the limit switch, thereby preventing further rotating of the seat back frame in the recline direction.

13. The method of claim 12, wherein the limit switch assembly further comprises a back bracket coupled with seat back frame, the method further comprising rotating the back bracket in response to the received input.

14. The method of claim 13, wherein the limit switch assembly further comprises a switch bracket coupled with the seat back frame, and wherein the link is coupled with the switch bracket.

15. The method of claim 14, wherein the back bracket comprises a first end face and the link comprises a second end face, the method further comprising imparting a force on the second end face with the first end face in response to the receive input when the link is in the second position.

16. The method of claim 15, wherein the force imparted on the second end face is in a direction opposite the direction of the bias force imparted by the bias member.

17. The method of claim 16, wherein the link comprises a third end face, and wherein moving the link from the first position to the second position comprises lifting the third end face from contacting the limit switch in response to the received input when the link is in the second position.

18. The method of claim 17, wherein the limit switch is biased to open when the link is moved to the second position.

19. The method of claim 18,
wherein the seat further comprises a rotator and a motor,
wherein the seat back frame is rotatably coupled with the seat bottom frame via the rotator,
wherein rotating the seat back frame further comprises actuating the motor to rotate the rotator in response to the received input, and
wherein opening the limit switch prevents power from reaching the motor.

20. A powered recliner control device for a vehicle seat, the device comprising:
a limiting switch biased to an open circuit position, the switch being attached at a first point on a seat that is fixed relative to reclining movement of a seat back;
a link attached so as to rotate about a second point on the seat that is fixed relative to reclined movement of the seat back;
a biasing device operatively engaged with the link so as to biasedly engage the limiting switch at a first end of the link when the link is in a first position, in which the seat back is upright or forward inclined, the engaged link placing the limiting switch in a closed circuit position that enables the reclining movement of the seat back via a control circuit and a motor, wherein the direction of bias of the biasing device is opposite the direction of bias of the limiting switch; and
a bracket attached to seat back, the bracket being moveable with the moveable seat back between a first movement range and a second movement range, wherein the bracket engages the link at a second end of the link only in the second movement range, and wherein the switch is placed in an open circuit position when the bracket engages the link in the second movement range.

* * * * *